United States Patent
Tayenaka et al.

(10) Patent No.: US 10,633,842 B2
(45) Date of Patent: Apr. 28, 2020

(54) SYSTEMS AND METHODS FOR CONTROLLING WATER FLOW

(71) Applicant: Eva Smart Shower, LLC, Santa Anna, CA (US)

(72) Inventors: Torrey R. Tayenaka, Santa Anna, CA (US); Haris Ali Karim, Yorba Linda, CA (US)

(73) Assignee: EVA SMART SHOWER, LLC, Irvine, CA (US)

( * ) Notice: Subject to any disclaimer, the term of this patent is extended or adjusted under 35 U.S.C. 154(b) by 282 days.

(21) Appl. No.: 15/061,864

(22) Filed: Mar. 4, 2016

(65) Prior Publication Data

US 2016/0258144 A1   Sep. 8, 2016

Related U.S. Application Data

(60) Provisional application No. 62/128,936, filed on Mar. 5, 2015, provisional application No. 62/193,484, filed on Jul. 16, 2015.

(51) Int. Cl.
| | |
|---|---|
| *G05D 7/06* | (2006.01) |
| *E03C 1/05* | (2006.01) |
| *E03C 1/02* | (2006.01) |
| *G05B 15/02* | (2006.01) |

(Continued)

(52) U.S. Cl.
CPC .............. *E03C 1/057* (2013.01); *E03C 1/025* (2013.01); *G05B 15/02* (2013.01); *G05D 7/0635* (2013.01); *G05D 23/1927* (2013.01); *G05D 27/02* (2013.01)

(58) Field of Classification Search
CPC ......... E03C 1/057; E03C 1/025; G05B 15/02; G05D 23/1927; G05D 7/0635; G05D 27/02

See application file for complete search history.

(56) References Cited

U.S. PATENT DOCUMENTS

| | | |
|---|---|---|
| 2,814,445 A | 11/1957 | Crawley |
| 3,007,648 A | 11/1961 | Fraser |
| 4,191,332 A | 3/1980 | De Langis et al. |

(Continued)

FOREIGN PATENT DOCUMENTS

| | | |
|---|---|---|
| CA | 02668155 | 11/2006 |
| KR | 20-0369189 | 12/2004 |

(Continued)

OTHER PUBLICATIONS

"Meet Eva: Shower partner, water saver" dated Apr. 15, 2015 http://www.ocregister.com/articles/eva-658185-shower-water.html.

(Continued)

*Primary Examiner* — Michele Fan
(74) *Attorney, Agent, or Firm* — Silver Legal LLC; Jarrett L. Silver

(57) ABSTRACT

A smart water conservation system comprises a flow assembly configured to discharge fluid received from a fluid source to a shower area at a variable flow rate, the flow assembly comprising a flow path and one or more valves positioned along the flow path; a proximity sensor system comprising one or more proximity sensors; and a controller configured to control operation of the smart water conservation system based at least in part on signals received from the proximity sensor system.

14 Claims, 11 Drawing Sheets

(51) Int. Cl.
*G05D 23/19* (2006.01)
*G05D 27/02* (2006.01)

(56) References Cited

U.S. PATENT DOCUMENTS

| | | |
|---|---|---|
| 4,420,811 A | 12/1983 | Tarnay et al. |
| 4,480,784 A | 11/1984 | Bennett |
| 4,716,605 A | 1/1988 | Sheperd et al. |
| 4,797,820 A | 1/1989 | Wilson et al. |
| 4,823,414 A | 4/1989 | Piersimoni et al. |
| 4,854,499 A | 8/1989 | Neuman |
| 4,867,189 A | 9/1989 | Neuman |
| 4,901,915 A | 2/1990 | Sakakibara |
| 4,921,209 A | 5/1990 | Noineau |
| 4,941,219 A | 7/1990 | Van Marcke |
| 5,025,516 A | 6/1991 | Wilson |
| 5,058,804 A | 10/1991 | Yonekubo et al. |
| 5,121,511 A | 6/1992 | Sakamoto et al. |
| 5,125,433 A | 6/1992 | DeMoss et al. |
| 5,402,812 A | 4/1995 | Moineau et al. |
| 5,577,664 A | 11/1996 | Heitzman |
| 5,829,072 A | 11/1998 | Hirsh et al. |
| 5,853,130 A | 12/1998 | Ellsworth |
| 5,855,356 A | 1/1999 | Fait |
| 5,868,311 A | 2/1999 | Cretu-Petra |
| 5,979,776 A | 11/1999 | Williams |
| 6,695,281 B2 | 2/2004 | Williams |
| 6,702,687 B1 | 3/2004 | Henry |
| 6,892,952 B2 | 5/2005 | Chang et al. |
| 7,624,757 B2 | 12/2009 | Schmitt |
| 7,658,212 B2 | 2/2010 | Meuleners et al. |
| 8,028,355 B2 | 10/2011 | Reeder et al. |
| 8,347,427 B2 | 1/2013 | Klicpera |
| 8,438,672 B2 | 5/2013 | Reeder et al. |
| 8,807,521 B2 | 8/2014 | Dunkl-Jacobs et al. |
| 8,876,025 B1 | 11/2014 | Wheeler |
| 8,893,320 B2 | 11/2014 | Wheeler |
| 9,032,564 B2 | 5/2015 | Reeder et al. |
| 9,266,136 B2 | 2/2016 | Klicpera |
| 2009/0293190 A1 | 12/2009 | Ringelstetter et al. |
| 2013/0167938 A1 | 7/2013 | Stimpson |
| 2014/0076415 A1 | 3/2014 | Dunki-Jacobs et al. |
| 2015/0247307 A1 | 9/2015 | Reeder et al. |
| 2016/0024765 A1 | 1/2016 | Hadia |

FOREIGN PATENT DOCUMENTS

| | | |
|---|---|---|
| KR | 20-0383253 | 5/2005 |
| KR | 20050080419 A * | 8/2005 |
| KR | 10-2009-0046252 | 5/2009 |
| KR | 10-2011-0062808 | 6/2011 |
| KR | 2011062808 A * | 6/2011 |
| WO | WO 1993/003943 | 8/1991 |
| WO | WO 2007/059051 | 4/2009 |

OTHER PUBLICATIONS

Jun. 22, 2016 International Search Report and Written Opinion from related PCT App. No. PCT/US2016/021027.

* cited by examiner

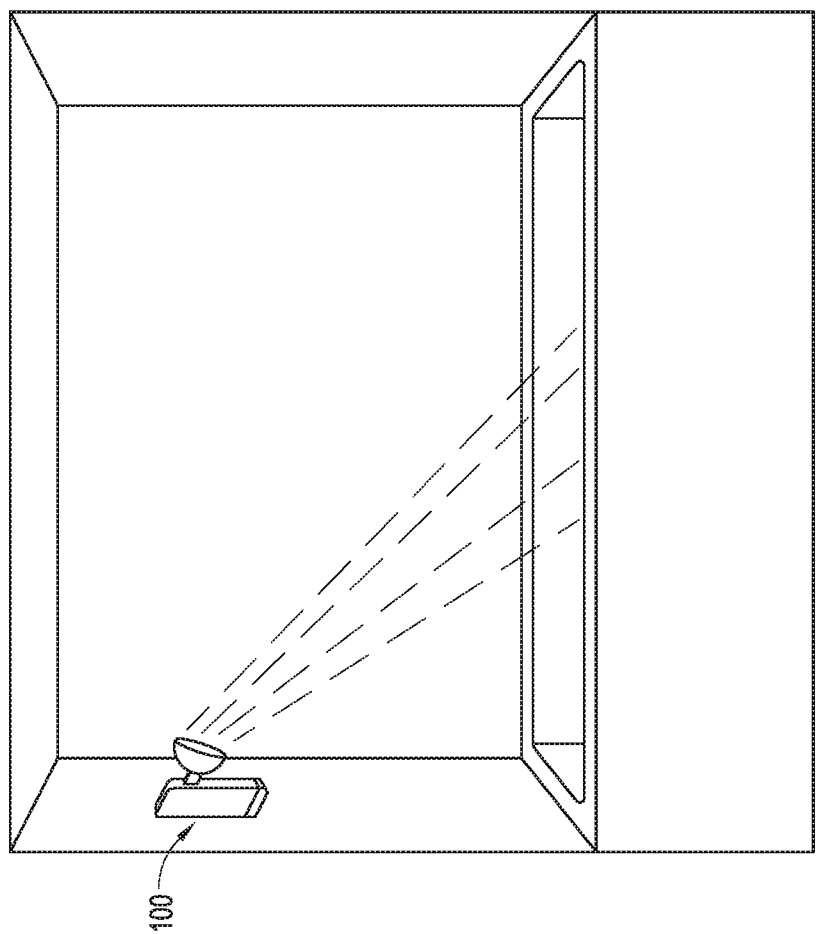
FIG. 2C

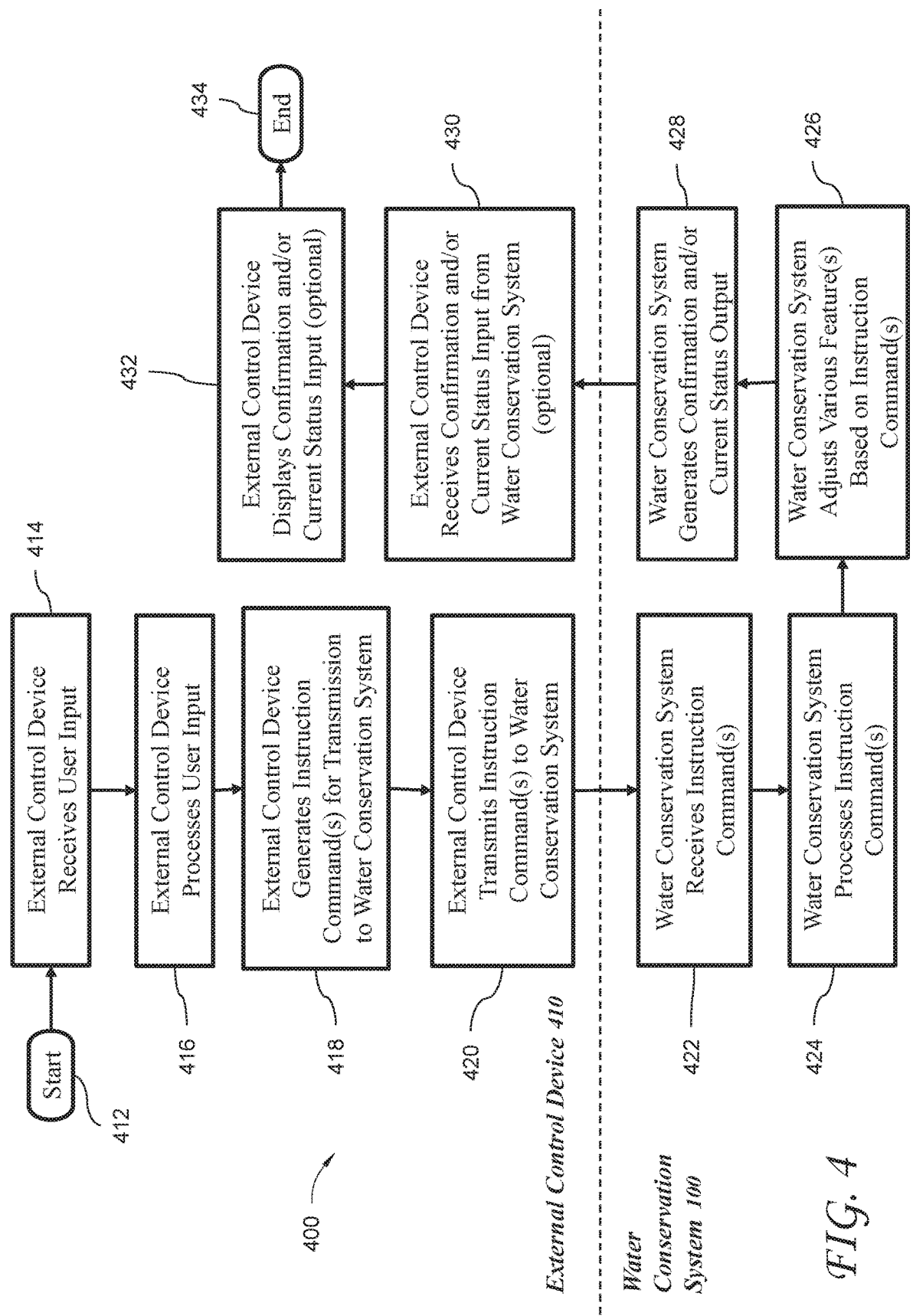

SYSTEMS AND METHODS FOR CONTROLLING WATER FLOW

CROSS-REFERENCE TO RELATED APPLICATIONS

This application claims the benefit of U.S. Provisional Application No. 62/128,936, filed Mar. 5, 2015, titled "SYSTEMS, METHODS, AND DEVICES DIRECTED TO APPARATUS FOR CONTROLLING WATER FLOW," and claims the benefit of U.S. Provisional Application No. 62/193,484, filed Jul. 16, 2015, titled "SYSTEMS, METHODS, AND DEVICES DIRECTED TO APPARATUS FOR CONTROLLING WATER FLOW," the disclosures of which are hereby incorporated by reference in their entirety herein.

BACKGROUND

Field

The embodiments disclosed herein relate to the field of water conservation, and more specifically, to systems, methods, and devices for a smart water conservation apparatus for use in a shower and/or other water output.

Description of the Related Art

Water conservation products may be used to conserve water in a variety of contexts, such as, for example, showers. Such products may be used, for example, to reduce the flowrate discharged from the showerhead. For example, there are many products on the market that limit the amount of water flow in a shower, including, for example, low-flow shower heads, water meters, and manual water throttles.

However, existing products such as these typically provide constant reduced flowrates throughout use unless the product is manually adjusted. In addition, existing products may not optimally save water, may not efficiently save water, and may leave users displeased with their water conservation experience. Accordingly, a continuing need exists for improved water conservation products for showers.

SUMMARY OF SOME EMBODIMENTS

The systems, methods, and devices described herein each have several aspects, no single one of which is solely responsible for its desirable attributes. Without limiting the scope of this invention as expressed by the claims which follow, some features are described briefly below. After considering this description, and particularly after reading the section entitled "Detailed Description of Some Embodiments," one will understand the advantageous features of the systems, methods, and devices described herein.

In some embodiments, a smart water conservation system for use in a shower is described. In some embodiments, the system can comprise a flow assembly configured to discharge fluid received from a fluid source to a shower area at a variable flow rate. In some embodiments, the flow assembly can comprise a flow path and one or more valves positioned along the flow path. In some embodiments, the system can comprise a proximity sensor system comprising one or more proximity sensors, the proximity sensor system being configured to detect a person's proximity to the smart water conservation system. In some embodiments, the system can comprise a temperature sensor system comprising one or more temperature sensors, the temperature sensor system being configured to measure the temperature of a fluid in the flow path. In some embodiments, the system can comprise a controller configured to control operation of the smart water conservation system based at least in part on signals received from at least one of the proximity sensor system and the temperature sensor system. In some embodiments, the controller can be configured to adjust the one or more valves in response to signals received from at least one of the proximity sensor system and the temperature sensor system to vary the flowrate at which fluid is discharged from an output of the smart water conservation system.

In some embodiments, the one or more valves can be selected from the group consisting of a variable flow valve and an on-off valve, the variable flow valve being selected from the group consisting of a ball valve, a step motor valve, a gate valve, a check valve, and a proportional valve, and the on-off valve being selected from the group consisting of a flip-flop valve and a solenoid valve.

In some embodiments, the flow assembly can comprise one variable flow valve. In some embodiments, the controller can be configured to vary the opening size of the one variable flow valve to vary the plurality of flowrates discharged from the system at any flowrate percentage in the range of approximately 0% and approximately 100%. In some embodiments, the controller can be configured to vary the opening size of the one variable flow valve to vary the plurality of flowrates discharged from the system at approximately 10% increments between 0% and 100%.

In some embodiments, the flow assembly can comprise three on-off flow valves, the controller being configured to fully open, partially open, or close the three on-off flow valves in any combination to vary the plurality of flowrates discharged from the system. In some embodiments, the controller can be configured to fully open and close the three on-off flow valves in any combination so that the plurality of flowrates discharged from the system comprise first, second, third, and fourth flowrate percentages, wherein the first flowrate percentage is in the range of 0% to 35%, the second flowrate percentage is in the range of 20% to 55%, the third flowrate percentage is in the range of 40% to 75%, and the fourth flowrate is in the range of 50% to 100%. In some embodiments, the first, second, third, and fourth flowrate percentages can comprise approximately 0%, approximately 30%, approximately 67%, and approximately 100%, respectively.

In some embodiments, the proximity sensor system can be configured to detect a person's distance from the system in the range of approximately 0.1 meters to approximately 4.0 meters.

In some embodiments, the shower area can be separated into a plurality of zones based on a distance from the system. In some embodiments, the controller can be configured to identify which of the plurality of zones a user is positioned in response to the one or more signals received from the proximity sensor system.

In some embodiments, the controller can be configured to compare a measured temperature against a temperature threshold. In some embodiments, the controller can be configured to close the one or more flow valves when the measured temperature is greater than or equal to the temperature threshold to terminate the flow through the system. In some embodiments, the temperature threshold can be a temperature in the range of approximately 80 degrees Fahrenheit to approximately 100 degrees Fahrenheit.

In some embodiments, the system can comprise a display. In some embodiments, the controller can be configured to provide an indication of flowrate or flowrate percentage on the display.

In some embodiments, a smart water conservation system for use in a shower is described. In some embodiments, the system can comprise a flow assembly configured to discharge fluid received from a fluid source to a shower area at a variable flow rate. In some embodiments, the flow assembly can comprise a flow path and one or more valves positioned along the flow path. In some embodiments, the system can comprise a proximity sensor system comprising one or more proximity sensors, the proximity sensor system being configured to detect a person's proximity to the smart water conservation system. In some embodiments, the system can comprise a controller configured to control operation of the smart water conservation system based at least in part on signals received from the proximity sensor system. In some embodiments, the controller can be configured to adjust the one or more valves in response to signals received from the proximity sensor system to vary the flowrate at which fluid is discharged from an output of the smart water conservation system.

In some embodiments, the one or more valves can comprise at least one of a variable flow valve and an on-off flow valve. In some embodiments, the controller can be configured to vary the opening size of the variable flow valve and to open and close the on-off flow valve to vary the plurality of flowrates discharged from the system at any flowrate percentage in the range of approximately 0% and approximately 100%.

In some embodiments, the shower area can be separated into a plurality of zones based on a distance from the system. In some embodiments, the controller can be configured to identify which of the plurality of zones a user is positioned in response to the one or more signals received from the proximity sensor system.

In some embodiments, a computer-implemented method for controlling a smart water conservation system for use in a shower is described. In some embodiments, the computer-implemented method can comprise measuring, by the computer system, a first distance. In some embodiments, in response to measuring the first distance, the computer-implemented method can comprise controlling by the computer system the one or more flow valves to set a first flowrate percentage to be discharged from the output of the system. In some embodiments, the computer-implemented method can comprise measuring, by the computer system, a second distance. In some embodiments, the computer-implemented method can comprise comparing, by the computer system, the first and second distances. In some embodiments, in response to determining, by the computer system, that the second distance is greater than the first distance based on the comparing, the computer-implemented method can comprise closing or partially closing one or more of the one or more flow valves to set a second flowrate percentage to be discharged from the output of the system that is less than the first flowrate percentage. In some embodiments, in response to determining, by the computer system, that the second distance is less than the first distance based on the comparing, the computer-implemented method can comprise opening or partially opening one or more of the one or more flow valves to set a third flowrate percentage to be discharged from the output of the system that is greater than the first flowrate percentage. In some embodiments, the first flowrate percentage can be a percentage in the range of approximately 0% and approximately 100%.

In some embodiments, the computer-implemented method can comprise measuring, by the computer system, a distance. In some embodiments, in response to measuring, by the computer system, the distance, the computer-implemented method can comprise determining by the computer system which zone of a plurality of zones a user is in, each of the plurality of zones being a different distance from the system.

In some embodiments, the computer-implemented method can comprise controlling, by the computer system, a flowrate percentage of the system based on the zone the user is determined to be in.

Details of one or more embodiments of the subject matter described in this application are set forth in the accompanying drawings and the description below. Any of the features, components, or details of any of the arrangements or embodiments disclosed in this application are combinable and modifiable to form myriad new arrangements and embodiments that fall within the spirit and scope of this disclosure. Other features, aspects, and advantages will also become apparent from the description, the drawings, and the claims. Note that the relative dimensions of the following figures may not be drawn to scale.

BRIEF DESCRIPTION OF THE DRAWINGS

Embodiments will now be described with reference to the following drawings, which are provided by way of example, and not by way of limitation. Like reference numerals indicate identical or functionally similar elements.

FIG. 2C is a perspective view of the smart water conservation system of FIG. 3 in communication with a mobile device or other control system, according to some embodiments.

FIG. 4 is a process flowchart between an external control device and the systems of FIGS. 1-3B, according to some embodiments.

DETAILED DESCRIPTION OF SOME EMBODIMENTS

Figure 1:
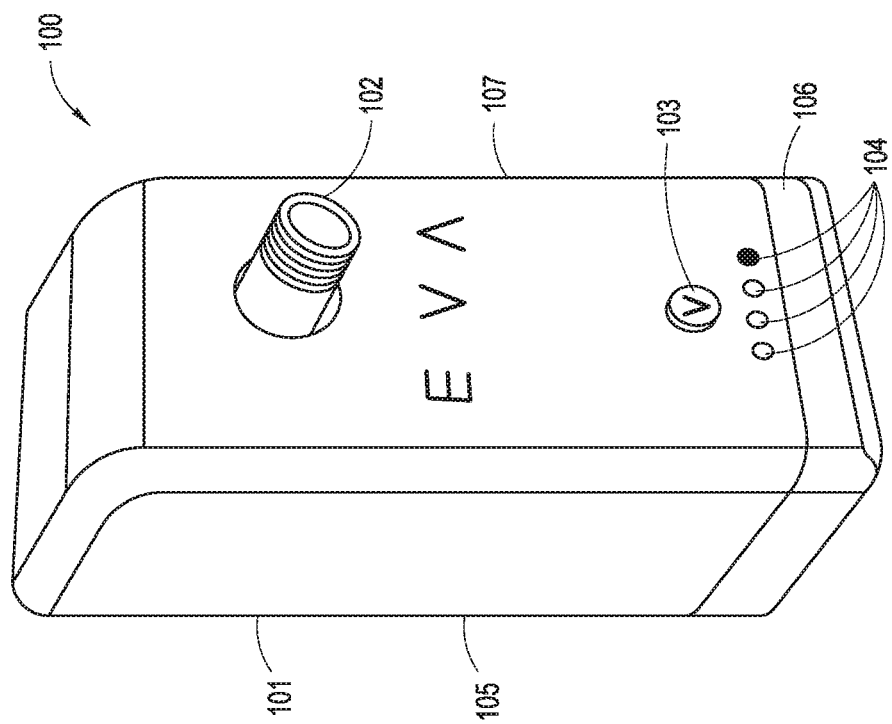
FIG. 1 is a perspective view of a smart water conservation system, in accordance with some embodiments.

Embodiments disclosed herein generally relate to water conservation, and in particular, to systems, methods, and devices for smart water conservation apparatuses for use in showers and/or in other water discharge applications. Various embodiments of the present disclosure provide smart water conservation systems, methods, and devices to help conserve water and eliminate waste by reducing the amount of water consumed. In particular, the present disclosure relates to smart water systems, methods, and devices which include one or more adjustable flow valves and a proximity sensor. For example, in various embodiments, the one or more adjustable flow valves can include a variable flow valve and/or two or more on-off valves. In some embodiments, variable flow through the system or device is achieved by controlling and/or combining the one or more adjustable flow valves. Various embodiments also illustrate example methods of controlling the smart water systems and devices disclosed herein, such as, for example, controlling the flow rate. While certain embodiments are described below, these embodiments are presented by way of example only, and can be embodied in different ways as defined and covered by the claims.

Further, although several embodiments, examples, and illustrations are disclosed below, it will be understood by those of ordinary skill in the art that the present disclosure extends beyond the various embodiments, examples, and illustrations described and shown herein, and also includes other uses of the present disclosure and obvious modifications and equivalents thereof. Embodiments of the present disclosure are described with reference to the accompanying figures, wherein like numerals refer to like elements throughout. The terminology used in the present disclosure is not intended to be interpreted in any limited or restrictive manner simply because it is being used in conjunction with a detailed description of certain specific embodiments. In addition, embodiments of the present disclosure can comprise several novel features and no single feature is solely responsible for its desirable attributes or is essential to practicing any aspect of the present disclosure. Further, it should be understood that any of the examples herein are non-limiting. As such, the present disclosure is not limited to any particular embodiments, aspects, concepts, structures, functionalities, or examples described herein.

In today's world, water scarcity is a major problem and affects every continent. Around 40% of the world's population experiences some sort of water scarcity for at least one month out of the year, whether from a water stress, water shortage, or water crisis event. The causes of water scarcity are many, including geography, drought, pollution, increased demand, and overuse, among others. However, regardless of how water scarcity is distilled into cause and effect, water conservation efforts can help to preserve the amount of available water, or otherwise reduce the rate at which it is consumed. For example, in the bathing context, it can be advantageous to reduce the amount of water consumed during showers. Shower conservation products typically reduce the amount of water consumed during showers by discharging water at decreased constant rates. By decreasing the constant rate at which water is discharged during a shower, the amount of water available for other uses can be increased, both inside and outside of the household. For example, in addition to increasing the water available for drinking and cooking, the amount of water available for industrial, agricultural, and environmental needs can also be increased. While decreasing the constant rate at which water is discharged from showers can reduce the total amount of water consumed during showers, it only works if the length of the showers is not increased as a result of the decrease.

Examples of ways to limit the amount of water flow during a shower, including, for example, using a low-flow shower heads, water meters, and manual water throttles. Each of these products can provide constant reduced flowrates throughout use but require a person to manually adjust the product to toggle between different reduced flowrates. While products such as these undoubtedly help to further water conservation efforts by providing reduced constant flowrates, more can be done not only to optimize each person's conservation footprint, but also to make making that conservation footprint more fun. For example, a product that is automatically and intelligently responsive not only to a person's shower needs, but also to their desires, would help to improve water conservation in addition to more fully engaging those people who are inspired to conserve water. However, designing and implementing so called smart water conservation products capable of automatic flowrate adjustment throughout use is challenging and expensive. Accordingly, a continuing need exists for systems, methods, and devices that provide for smart, intelligent, dynamic, and/or automatic water conservation in both showers and other water output settings alike.

The various embodiments of the present disclosure enable more water to be saved when compared to conventional shower products and other water conversation products while also making showers and other water conversation products more fun and interactive and useful. The various embodiments of the present disclosure also spotlight the conservation effort itself, helping it become more far-reaching by engaging larger audiences through various technology platforms, including, for example, social media, smartphone applications, proprietary software, and the like. The water conservation systems, methods, and devices disclosed herein accomplish these improvements and present a significant step forward in reducing the amount of water used in showers and other water output devices. As mentioned above, currently available shower products and other water conservation systems may provide reduced flowrates, but they do so at a constant rate unless a person manually adjusts them (if the device is even adjustable). However, simply reducing shower flowrates to lower constant rates may not optimally or most efficiently reduce the amount of water used during showers or in other situations. Further, current products may leave a portion of a user's water conservation potential untapped by not letting them participate beyond the mere purchase, installation, and use of the product, which may, as a result, deleteriously lead to conservation fatigue, perhaps growing out of frustration or boredom with the product itself.

The various embodiments contemplated by the present disclosure represent significant developments in the field of water conservation. The present disclosure relates to smart (also referred to as automatic or intelligent) water systems and devices that, in some embodiments, automatically and/or dynamically control the flow of water (and/or other parameters) through a showerhead or other water output device based on the needs and/or desires of a user in order to achieve water conservation while simultaneously increasing water conservation awareness of both the user and the public alike. Some of the various embodiments described herein also more fully engage a person wanting to conserve water by organically and synergistically integrating them into their water conservation experience via an interactive computer system replete with user preferences and water conservation tracking technology.

Various non-limiting embodiments of the present disclosure will now be discussed with reference to the appended drawings.

System Overview

The appended figures illustrate various smart water conservation systems and methods relating thereto. FIG. 1, for example, is a perspective view of a smart water conservation system 100, according to some embodiments. As described in greater detail below, the smart (also referred to as automatic or intelligent) water conservation systems described herein (e.g., system 100 of FIG. 1) can, in some embodiments, include one or more flow valves that automatically adjust the flowrate in response not only to a user's water conservation preferences, but also to their position relative to the system, although any suitable flow adjustment mechanisms can be used and are appreciated. In some embodiments, the one or more flow valves can be configured to reduce, or otherwise adjust (e.g., increase or decrease), the water flowrate through the system by adjusting, controlling, opening and/or closing one or more valves in response to electronic signals relating to, for example, water temperature thresholds, user position boundaries (e.g., user proximity data), time limits, and/or usage thresholds. In this way, the smart water conservation systems described herein can reduce the amount of water used during showers. To this end, in some embodiments, various temperature thresholds, various user position boundaries, various time limits, and/or various usage thresholds can be programmed or entered into the system. For example, in some embodiments, the various thresholds, boundaries, and limits associated with the system can be system presets (e.g., manufacturing presets) and/or user entered (e.g., via a user interface). To implement such various thresholds, boundaries, and limits, each of which can either terminate, reduce, and/or adjust the flowrate through the system, the system can include, in some embodiments, one or more temperature sensors, one or more proximity sensors, one or more timers, and/or one or more usage sensors (e.g., ultrasonic water meters, or any other suitable flow sensor).

In some embodiments, the smart water conservation systems can attach between a shower head and shower pipe. Once attached, the smart water conservation systems can reduce water usage during showers in one or more complementary ways. For example, in some embodiments, the smart water conservation systems can reduce water usage during showers with (1) a temperature sensor system, (2) a proximity sensor system, (3) a timer system, and/or (4) a usage sensor system. The temperature sensor system can shut off, reduce, and/or otherwise modify water flow through the system when one or more temperature thresholds are reached. The proximity sensor system can adjust water flow through the system based on a user's position relative to the system and/or point of flow. The timer system can notify users when they are taking too long of a shower (e.g., exceeded or approaching a time threshold). The usage sensor system can notify users when they have used too much water (e.g., exceeded or approaching a usage threshold). In some embodiments, the temperature sensor system, the proximity sensor system, the timer system, and/or the usage sensor system can be in electrical communication with a controller which can be integrated with or remote to the system. The controller can control water flow through the systems by opening or closing one or more valves, in addition to various other features (e.g., one or more restrictor valves). In some embodiments, one or more of the systems described herein can be configured to transmit electrical signals directly to the one or more flow valves from any one or more of the electrical systems (e.g., any one or more of the temperature sensor system, the proximity sensor system, the timer system, and/or the usage sensor system, among any other suitable electrical system that is capable of controlling the flow of water).

In some embodiments, a single valve can be used to increase or decrease water flow through the system, and in some embodiments, multiple valves can be used to increase or decrease water flow through the system. For example, in some embodiments, the system can increase or decrease the flow of fluid (e.g., water) being discharged from an output (e.g., showerhead) by controlling a plurality of flows and/or flowrates via one or more valves. As described in more detail below, the one or more valves can include an on-off valve (e.g., an on-off solenoid valve), a variable flow valve, a ball valve, a step motor valve, and/or a pressure reducing valve, among any other suitable type of flow valve. The one or more valves can be arranged in parallel and/or in series. The one or more valves can be one-way, two-way, or three-way valves, among others. For example, in some embodiments, the systems can increase and/or decrease a user's water usage with a single valve, such as, for example, a single variable flow valve. By controlling the opening size (and/or other features) of the single variable flow valve, the rate at which water is discharged from the shower head can be increased or decreased (also referred to as varied). In some embodiments, the discharge of fluid (e.g., water) through the systems can be increased or decreased by controlling the opening size (and/or other features) of multiple valves (e.g., two or more on-off solenoid valves). As another example, the system can control a plurality of valves, including, for example, one or more variable flow valves, one or more on-off flow valves, and/or one or more restrictor valves, in addition to any other type of suitable valve with or without a restrictor valve (or other flow restricting component). For example, in some embodiments, the plurality of flow valves can be two or more on-off solenoid valves. In embodiments with multiple flow valves, the valves may be opened or closed in any combination to effectively achieve variable flow. Variable flow with multiple valves can be realized, for example, by individually, cooperatively, and/or collectively opening and/or closing a plurality of valves. Any number of valves can be opened in any combination. The plurality of valves can be synchronously and/or asynchronously opened and closed. In some embodiments, one or more flow valves can be used to control one or more of flows (also referred to as flow paths). A flow valve can turn one or more flows on and off. In some embodiments, one or more restrictor valves can be used to control the flowrates through the one or more flow paths that the one or more flow valves turn on and off. A restrictor valve can adjust the flowrate through one or more open flow paths. The one or more flow valves (e.g., a plurality) and the one or more restrictor valves (e.g., a plurality) can work together to control the flow, flowrate, and/or total amount of flow discharged by a showerhead, where the total amount of flow at the showerhead is the combined flow of the one or more flows that the flow valves turn and off and which the one or more restrictor valves regulate.

In various embodiments, any suitable number of valves as well as type, including, for example, on-off valves and/or variable flowrate valves (among others), can be utilized on its own or in combination with one another to effect various variable flow rates, various variable flow patterns, various temperatures of water flow, and/or the like. For example, in some embodiments, a combination of on-off valves (e.g., solenoid valves) and/or variable flowrate valves can be combined in various parallel and/or series arrangements/configurations to achieve controllable variable flow. For example, a plurality of on-off solenoid valves which turn on and off different flow rates may be used in parallel to achieve a plurality of flowrates. It should be appreciated that, in some embodiments, the total number of parts of the smart water conservation system can be reduced by using a single variable flow valve or by minimizing the total number of valves in multiple valve systems.

In some embodiments, a single variable flow valve can be used to effect any suitable flow rate in the range of 0% to 100% such that the flow rate discharged from the system 100 is in the range of 0% to 100% of an input flow (e.g., the flow received from a shower pipe) and/or an input flow rate (e.g., the flow rate received from a shower pipe). For example, in some embodiments, the flow rate through the variable flow valve can be about 10%, about 20%, about 30%, about 40%, about 50%, about 60%, about 70%, about 80%, about 90%, or about 100% of the input flow/flowrate, and/or the like, although any suitable percentage is appreciated. In some embodiments, a controller of the system can control the flowrate to within +/−1%, +/−2%, +/−3%, +/−4%, +/−5%, +/−10%, and the like. Similarly, in some embodiments the tolerance of any opening size of the variable flow valve can correspond to flow rates that are accurate to within +/−1%, +/−2%, +/−3%, +/−4%, +/−5%, +/−10%, and the like. In some embodiments, the variable flow valve can be controlled such that the minimum flow rate is 0% and the maximum flow rate is 100%. In some embodiments. the variable flow valve can be controlled such that the minimum flow rate is 0% and the maximum flow rate is less than 100%. For example, in some embodiments, the maximum flow rate can correspond to flow/flowrate percentages of 10%, 15%, 20%, 25%, 30%, 35%, 40%, 45%, 50%, 55%, 60%, 65%, 70%, 75%, 80%, 85%, 90%, or 95% and the like, such as, for example, 50% or 80%. Advantageously, maximum flows/flowrates less than 100% can allow users to save more water.

In some embodiments, a plurality of flow valves can be used to effect controllable variable flow (e.g., two or more flow rates). For example, in some embodiments, three on-off valves (e.g., solenoid valves) can be used to effect controllable variable flow (e.g., solenoid valves A, B, and C). In some embodiments, one or more of the plurality of flow valves can be associated with a flow restriction mechanism, such as, for example, a restrictor valve. In such embodiments, valve A can be configured to allow 100% of the input flowrate to pass therethrough (e.g., 0% flow restriction), valve B can be configured to allow 75% of the input flowrate to pass therethrough (e.g., 25% flow restriction), and valve C can be configured to allow 50% of the input flowrate to pass therethrough (e.g., 50% flow restriction), although any suitable flow rate percentage and flow restriction percentages are appreciated. In this example, to achieve an output flow rate of 100%, 75%, or 50% of the input flow rate, the system 100 can open valve A, B, or C (if the valves are normally closed), respectively, and keep the other two valves closed (if the valves are normally closed). However, the system 100 can also be configured to open two or more valves at the same time to achieve an overall flowrate that may be different from the flowrate that any individual valve is designed to allow to pass through. For example, simultaneously opening valves B (25% flow restriction) and C (50% flow restriction) would ideally result in an overall 16.7% flow reduction using, for example, the following parallel flow restriction calculation: $1/((1/50)+(1/25))=16.7\%$.

Any number of valves (e.g., multiple valves or one or more on-off solenoid valves) can be utilized in the systems 100 described herein, with flowrates through any individual valve being, for example, about 10%, about 20%, about 30%, about 40%, about 50%, about 60%, about 70%, about 80%, about 90%, or about 100% of the input flow/flowrate, and/or the like (with the corresponding flow restriction percentages being about 90%, about 80%, about 70%, about 60%, about 50%, about 40%, about 30%, about 20%, about 10%, and about 0%, respectively, and/or the like if a corresponding restrictor valve is used, although any suitable flow restriction percentage is also appreciated). In some embodiments, the flowrate through any valve may range between 0% and 100% of the input flow/flowrate, such as, for example, 0%, 5%, 10%, 15%, 20%, 25%, 30%, 35%, 40%, 45%, 55%, 60%, 65%, 70%, 75%, 80%, 85%, 90%, 95%, or 100% of the input flow/flowrate, or any other suitable percentage (with the corresponding flow restriction percentages ranging from between 100% and 0%, respectively, such as, for example, 100%, 95%, 90%, 85%, 80%, 75%, 70%, 65%, 60%, 55%, 50%, 45%, 40%, 35%, 30%, 25%, 20%, 15%, 10%, 5%, and 0%, or any other suitable percentage if a corresponding restrictor valve is used, although any suitable restriction flow percentage is also appreciated). In some embodiments, the flowrates for individual valves may range from about 0% to about 10%, from about 5% to about 15%, from about 10% to about 20%, from about 15% to about 25%, from about 20% to about 30%, from about 25% to about 35%, from about 30% to about 40%, from about 35% to about 45%, from about 40% to about 50%, from about 45% to about 55%, from about 50% to about 60%, from about 55% to about 65%, from about 60% to about 70%, from about 65% to about 75%, from about 70% to about 80%, from about 75% to about 85%, from about 80% to about 90%, from about 85% to about 95%, or from about 90% to about 100% of the input flow/flowrate, or any other suitable range (with the corresponding flow restriction percentages being between about 90% and about 100%, between about 85% and about 95%, between about 80% and about 90%, between about 75% and about 85%, between about 70% and about 80%, between about 65% and about 75%, between about 60% and about 70%, between about 55% and about 65%, between about 50% and about 60%, between about 45% and about 55%, between about 40% and about 50%, between about 35% and about 45%, between about 30% and about 40%, between about 25% and about 35%, between about 20% and about 30%, between about 15% and about 25%, between about 10% and about 20%, between about 5% and about 15%, between about 0% and about 10%, or any other suitable range if a corresponding restrictor valves are used, although any suitable restriction flowrate percentage range is also appreciated). Any suitable combination of flows/flowrates is appreciated. Any suitable number of flows/flowrates is appreciated. In some embodiments, it may be desirable to utilize a combination of on-off and/or variable-flow valves, as opposed to a single variable-flow valve, because such a design may utilize less electricity to operate, may respond faster to user movement and/or other changes in system operating parameters (e.g., temperature thresholds, timer limits, usage thresholds), among other advantages.

As described above for single variable flow valve embodiments, in embodiments with a plurality of flow valves, the multiple flow valves can be controlled such that the minimum flow rate discharged by the system 100 is 0% and the maximum flow rate discharged by the system 100 is 100%. In some embodiments, the multiple valves can be controlled such that the minimum flow rate discharged by the system 100 is 0% and the maximum flow rate discharged by the system 100 is less than 100%. For example, in some embodiments, the maximum flow rate can correspond to flow/flowrate percentages of 10%, 15%, 20%, 25%, 30%, 35%, 40%, 45%, 50%, 55%, 60%, 65%, 70%, 75%, 80%, 85%, 90%, or 95% and the like, such as, for example, 50% or 80%. Advantageously, maximum flows/flowrates less than 100% allow users to save more water.

In some embodiments, the smart water conservation systems 100 described herein are designed to reduce the amount of water consumed during showers without users having to do anything other than optionally inputting their water conservation preferences into the system (e.g., proximity, flowrate, shower length, and/or water usage preferences). However, other embodiments of the systems may be configured to enable more or less user involvement and inputs, whether active or passive. For example, in some embodiments, the systems can detect when a user needs or desires more or less water and when they do not, automatically and dynamically adjusting the water flow during a shower via, for example, one or more flow valves in response to the user's position relative to the device. In some embodiments, the systems, when used regularly, can be configured to change the way users think about their water usage and raise awareness of water conservation. In some embodiments, features such as temperature shutoff, proximity sensing flow adjustment, and goal setting can help users to save/reduce water usage while maintaining the quality and enjoyment of a normal shower experience. In some embodiments, the system can be installed with the standard ½-inch shower pipe, can be fit nicely between the shower wall and shower head. In some embodiments, systems having a single variable flow valve system may have dimensions of approximately 6.5"×4"×2," and systems having a multiple flow valve system may have dimensions of approximately 10"× 6"×3". It should be appreciated that any suitable dimension is appreciated. Further, in some embodiments, the dimensions may be much larger, for example, taking up an entire room or significant wall space (inside or outside), where the application is for an entire facility (e.g., university facilities, high school gym facilities, commercial gym facilities, military facilities (barracks, latrines, etc.), hotel facilities, or manufacturing facilities, among others).

As described above, the systems can include, in some embodiments, one or more temperature sensors, one or more proximity sensors, one or more timers, and/or one or more usage sensors (also referred to as flow sensors) to control the system. In embodiments with one or more temperature sensors (which are also referred to as detectors), the smart water conservation systems can be configured to utilize the temperature sensors to determine when the temperature of the water has reached a certain threshold and can be further configured to reduce and/or turn off the flow of water after the water temperature has reached a certain temperature threshold. In embodiments with one or more proximity sensors, the smart water conservation systems can be configured to use the proximity sensors to control and/or throttle water. In these embodiments, the control and/or throttle of water flow can be based off a user's needs, desires, and/or physical positioning relative to the systems. In embodiments with one or more timers, the smart water conservation systems can be configured to monitor and/or track the length of showers. In some embodiments, the systems can, for example, be configured to output a reminder to a user when the system detects that the duration of the shower is approaching, has satisfied, and/or has exceeded one or more time thresholds. In embodiments with one or more flow sensors (e.g., water meters), the smart water conservation systems can be configured to monitor and/or track the amount of water used during showers. In these embodiments, the systems can, for example, be configured to output a reminder to a user when the system detects that the water usage of the shower exceeds a certain usage threshold.

In some embodiments, the systems comprise a low-voltage energy conscious apparatus that include a user interface having one or more control buttons to manipulate the functionality of the device at least with respect to temperature shutoff, proximity sensing flow adjustment, and time and water usage limits. For example, in some embodiments, the systems may have three control buttons, one for power (e.g., on/off), one for wireless communication, and one for a menu that has choices enabling a user to manipulate the functionality of the device. However, in other embodiments, the systems can also be configured to communicate with and/or be controlled by a mobile application and/or other control system via Bluetooth or other communication channel, wireless connection, or interface.

In addition to the embodiments described above, the water conservation systems may further comprise functionality that tracks and analyzes water conservation data for one or more users. For example, in some embodiments, a mobile application and/or other control system can provide users with comprehensive shower statistics. The control system can be configured to allow users to track their water usage and waste as well as share their water conservation numbers with their social networks through a social media website or platform.

For installation, the system can be generally configured to attach between a standard ½-inch National Pipe Thread (NPT) shower head pipe and a standard ½-inch NPT shower pipe; however, one of skill in the art will recognize that the system can also be configured to work with other size piping.

While various features and concepts are described and contemplated herein with reference to shower use, other water usage applications are also appreciated, including, for example, faucet use, toilet use, irrigation sprinklers, child play sprinklers, waterpark water features such as water slides, among others, and/or the like, in both residential and commercial settings.

Additional non-limiting embodiments of the present disclosure will now be discussed in greater detail with reference to the appended drawings.

Mechanical Aspects of the Present Disclosure

As briefly mentioned above, FIG. 1 is a perspective view of a smart water conservation system 100, according to some embodiments. As shown, the smart water conservation system 100 may include a shower pipe connector 101, a shower head connector 102, at least one control button 103, an indicator system 104, a proximity sensor system 106, and a shell 107. In some embodiments, the shower pipe connector 101 and the shower head connector 102 can be standard ½-inch National Pipe Thread (NPT) connectors. In other embodiments, these connectors can be any suitably sized and shaped connector.

The indicator system 104 can include visual, audible, and/or other types of indicators to notify users to one or more operating conditions of the system 100. The indicators can include speakers, displays, light sources, etc., and/or combinations thereof. For example, in some embodiments, the indicator system 104 can comprise one or more light emitting diodes (LEDs), or any other suitable light source. The indicator system 104 can notify users to various operating conditions of the system 100, including user proximity, current flowrate, activated flowrate region, water temperature, shower duration, water use, and battery level, among others.

The proximity sensor system 106 can include one or more proximity sensors configured to determine a user's distance relative to the system 100 or a point of flow associated with the system 100 (e.g., a showerhead). The proximity sensor system 106 can include any type of suitable sensor. For example, in some embodiments, the proximity sensor system 106 comprises one or more ultrasonic sensors, infrared sensors, laser sensors, radar sensors, sonar sensors, inductive sensors, and the like, or any combination thereof. In some embodiments, the proximity sensors can detect any suitable distance from the system 100 and/or from one or more points of flow associated with the system 100. In some embodiments, proximity data from the proximity sensor system 106 can be transmitted to a controller and/or to a valve system of the device (not shown). In this way, the proximity sensor system 106 can be used to adjust the amount of water flowing through the system 100 based on a user's position relative to the system 100 (e.g., a reference point on the system 100 or a point of flow associated with the device, e.g., the showerhead or other output).

Although not shown in FIG. 1, the system 100 can include a temperature sensor system, a timer system, and/or a usage sensor system, among other systems, each of which can be implemented to adjust the amount of fluid (e.g., water) flowing through the system 100 at various times. For example, in some embodiments, the temperature sensor system can shut off, reduce, and/or otherwise modify water flow through the system when one or more temperature thresholds are reached. The timer system can notify users when they are taking too long of a shower (e.g., have exceeded or are approaching a time threshold). The usage sensor system can notify users when they have used too much water (e.g., have exceeded or are approaching a usage threshold). As discussed above, the temperature sensor system can comprise one or more temperature sensors, the timer system can comprise one or more timers, and the usage sensor system can comprise one or more usage sensors (e.g., e.g., ultrasonic water meters or any other suitable flow sensor).

The shell 107 defines an enclosure configured to house various mechanical and electrical features/components/systems of the system 100. In some embodiments, the shell is configured to house the internal components of the system 100 with a watertight seal. For example, the shell 107 can house a flow pathway and a valve system (not shown), as well as the various electronic features/components/systems of the system 100 (e.g., the indicator system 104, the proximity sensor system 106, the temperature sensor system, the timer system, and/or the usage sensor system, among other systems). In some embodiments, one or more of the various mechanical and/or electronic features/components/systems of the system 100 can be integrated with any portion of the flow pathway positioned outside of the shell 107. For example, in some embodiments, the proximity sensor system can be attached to a showerhead, and in some embodiments, one or more valves can be installed in any portion of piping that is positioned outside of the shell 107, such as, for example, in any part of the existing fluid pipe (e.g., shower pipe) to which the system 100 is attached (e.g., inside of a wall of behind a shower). As another example, in some embodiments, the indicator system 104 can be integrated with an overhead light in the shower or with a shower curtain having light illumination capabilities.

The shell 107 can have a rear hole (not shown) so that the system 100 can connect to a water pipe (also not shown). The shell 107 can have a front hole through which the shower head connector 102 can extend from the system 100. In some embodiments, the shower head connector 102 can be integrally formed with the front of the shell 107 so that no front hole is necessary. The rear and front holes can include one or more sealing components configured to prevent water and/or other fluids from getting inside the shell and damaging the internal components. In some embodiments, the shower pipe connector 101 and the shower head connector 102 can be fitted to the exterior of the shell 107.

The shell 107 can be made of any suitable material. For example, in some embodiments, the shell 107 comprises water-proofed plastic. However, other suitable water-proofed materials are also envisioned, such as, for example, metal or composite material. The shell 107 can take on any suitable size and/or any suitable form. For example, in FIG. 1, the shell 107 is generally rectangular in shape, although other shapes are also appreciated, including irregular shapes. In some embodiments, the shell 107 dimensions can be approximately 6.5"×4"×2"; however, any other suitable dimensions are also appreciated, such as, for example, 10"×6"×3", among others. In some embodiments, the system 100 can be mounted flush or nearly flush to a shower wall. In other embodiments, the system can be mounted some distance away from a shower wall, such as, for example, 4 to 6 inches, or any other suitable distance. In some embodiments, the system 100 can include a swivel connection so that the device can be mounted straight relative to a shower wall. In some embodiments, the rear of the system 100 can include a wall seal 105. The wall seal 105 can be configured to rest flush against a shower wall after the system 100 has been installed. In some embodiments, the wall seal 105 can include one or more suction devices which are configured to attach to a shower wall to help stabilize the system 100, although any suitable type of attachment device is appreciated.

In some embodiments, the at least one control button 103 comprises a user interface. For example, in some embodiments, the at least one control button 103 can comprise one or more external buttons. In other embodiments, the at least one control button 103 can comprise a touch screen. However, any suitable user interface is appreciated. The at least one control button 103 can control various aspects of the system 100. For example, in some embodiments, the at least one control button 103 can turn the system 100 on and off as well as input or adjust a range of other settings. For example, in some embodiments, the control button 103 can control the range differentiation of the proximity sensor system 106, the sensitivity of the proximity sensor system 106 (e.g., high, medium, or low), the temperature thresholds of the temperature sensor system, the time limits of the timer system, and/or the usage thresholds of the usage sensor system, among others. In some embodiments, the at least one control button 103 comprises three external buttons, one for power on/off, one for wireless communication, and one for a menu associated with a us that has choices enabling a user to manipulate the functionality of the device.

In the illustrated embodiment of FIG. 1, the system 100 includes one control button 103, four indicator lights 104, and one proximity sensor 106, but systems with more or less of these components and/or systems, and/or other input and/or output features are also envisioned. For example, in some embodiments, between 1 and 10 or more control buttons can be used, between 1 and 10 or more indicators can be used, and between 1 and 10 or more proximity sensors can be used, among any other suitable combination of features and components as described and contemplated herein. In addition, other orientations and/or arrangements of the features/components/systems illustrated in FIG. 1 are also appreciated. For example, the proximity sensor system 106 can be positioned at any suitable location within or outside the housing, such as, for example, near the top of the shell 107. As other non-limiting examples, the indicator system 104 can be positioned at any suitable location (e.g., near the top of the shell 107) and the at least one control button 103 can be positioned at any suitable location (e.g., on a side of the shell 107).

The various mechanical and electrical features and arrangements of FIG. 1 will be described in greater detail below with reference to the embodiments in the figures that follow (e.g., FIGS. 3A and 3B), such as, for example, the at least one control button 103, the indicator system 104, the proximity sensor system 106, the temperature sensor system, the timer system, the usage sensor system, the flow pathway, and the valve system, among others.

Figure 2A:
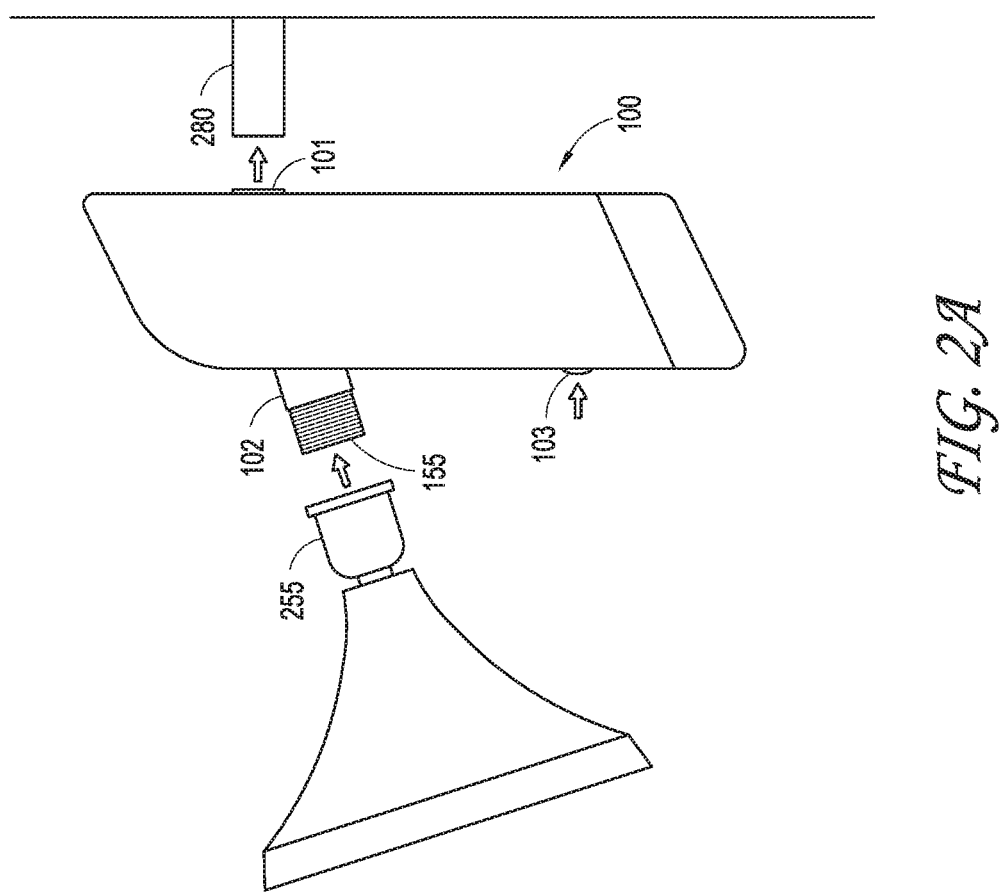
FIG. 2A is a side view of the smart water conservation system of FIG. 1 being installed, according to some embodiments.
Figure 2B:
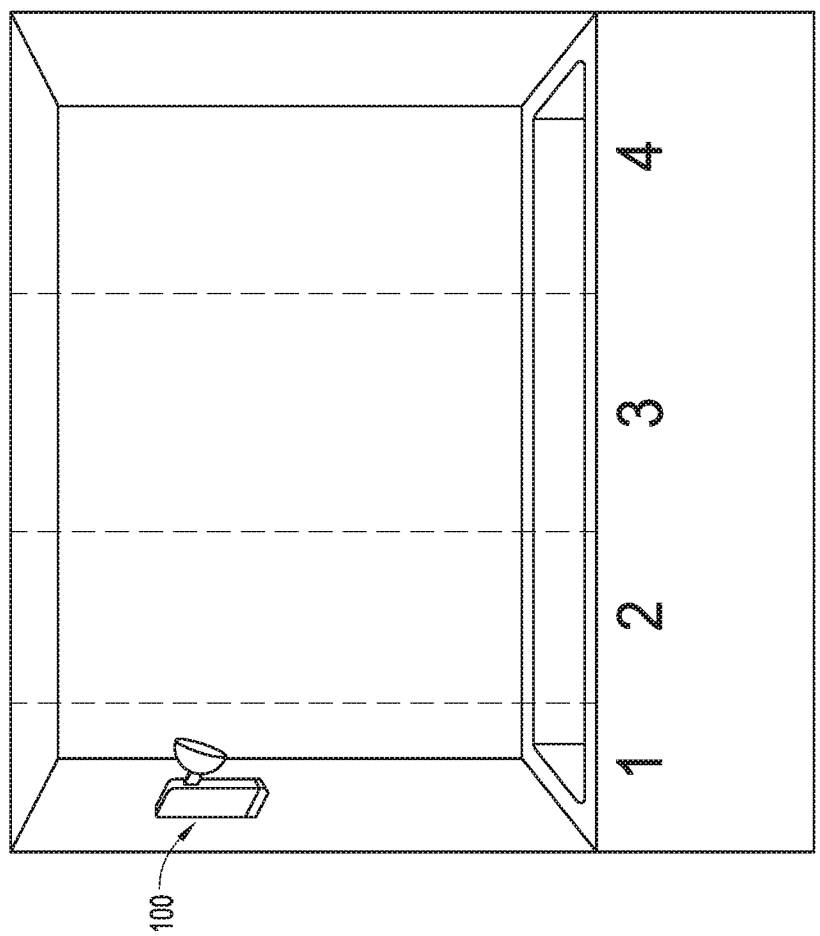
FIG. 2B is a perspective view of the smart water conservation system of FIG. 1 with a shower head attached in the context of a shower area, according to some embodiments.

FIGS. 2A-2C illustrate various views of the system 100 in the context of a shower. Unless otherwise noted, reference numerals and like-named components in FIGS. 2A-2C refer to components that are the same as or generally similar to the components of FIG. 1. FIG. 2A is a side view of the smart water conservation system 100 of FIG. 1 during an installation procedure involving three steps, although any suitable number of steps is appreciated, and in any suitable order. In some embodiments, the first step can include attaching a shower pipe connector 101 of the system 100 to a standard shower pipe 280. The second step can include attaching a shower head 255 to a showerhead connector 102 of the system 100. The third step can include pressing a control button 103 to turn on and calibrate the system 100. In some embodiments, the system can connect between a standard ½-inch NPT shower pipe and standard ½-inch NPT shower head. However, it should be appreciated that the system 100 can also be configured to work with any other size piping. Although not shown in FIG. 2A, in some embodiments, the system 100 can be attached with a top mount bracket to the ceiling of a shower. Although not shown in FIG. 2A, in wall installation is also appreciated. For example, in some embodiments, the system 100 can be built into the wall of the shower. Advantageously, in wall installation can allow for the system 100 to be hardwired into an alternating current (AC) source (e.g., a home or other building). As a result, in some embodiments, in wall installation can remove the need for one or more batteries to power the system 100, although one or more batteries can still be employed as a backup power source. Further, in some embodiments, in wall installation can also remove the need for any manual controls (e.g., one or more control buttons 103). For example, in some embodiments, systems 100 that are installed behind a wall can be controlled from a mobile device, although any suitable wireless communication device is appreciated. In some embodiments, in wall installation can comprise installing the system 100 in the wall such that a user interface is flush with the shower wall after installation. The exposed user interface can be watertight and its perimeter relative to the surrounding wall can be sealed with any suitable sealing material or component. Similarly, in some embodiments, in wall installation can comprise installing the system 100 in the wall such that the user interface extends from the wall a short distance (e.g., between 2 inches and 6 inches). In such embodiments, a top surface of the user interface can be used as a shelf, such as, for example, for shampoo bottles and/or soap. In some embodiments, one or more hooks can be attached to the bottom surface of the user interface for various shower items, such as, for example, one or more loofas.

FIG. 2B is a perspective view of the smart water conservation system of FIG. 1 with a shower head attached in the context of a shower area, according to some embodiments. In some embodiments, the shower area can be separated into one or more zones (also referred to as areas or regions). As shown in FIG. 2B, in some embodiments, the shower area can be broken up into four zones (e.g., zones 1, 2, 3, and 4), although any number of suitable zones is appreciated. For example, in some embodiments, the shower area can be separated into 2, 3, 5, 6, or more zones. In some embodiments, the proximity sensor system 106 can be configured to determine what zone users are positioned in. For example, as described in more detail below, a user's position relative to the system 100 can trigger (also referred to as activate) various flows and/or flowrates to be discharged from the system 100, among other flow properties. In some embodiments, one or more flow properties can be associated with one or more zones. For example, in some embodiments, users can trigger various flows and/or flowrates based on what zone they are in, as determined by the proximity sensor system 106. In some embodiments, the one or more flow properties associated with one or more of the zones can change as the length of the shower increases. For example, in some embodiments, the flowrate associated with one or more of the zones can slowly decrease as the time of the shower increases. In some embodiments, the one or more zones can be uniformly or non-uniformly divided up. In some embodiments, the one or more zones can be customized by users.

FIG. 2C is a perspective view of the smart water conservation system of FIG. 1 in communication with a mobile device or other control system, according to some embodiments, which is described in more detail below in the context of the wireless receiver 204 shown in FIG. 3A.

Figure 3A:
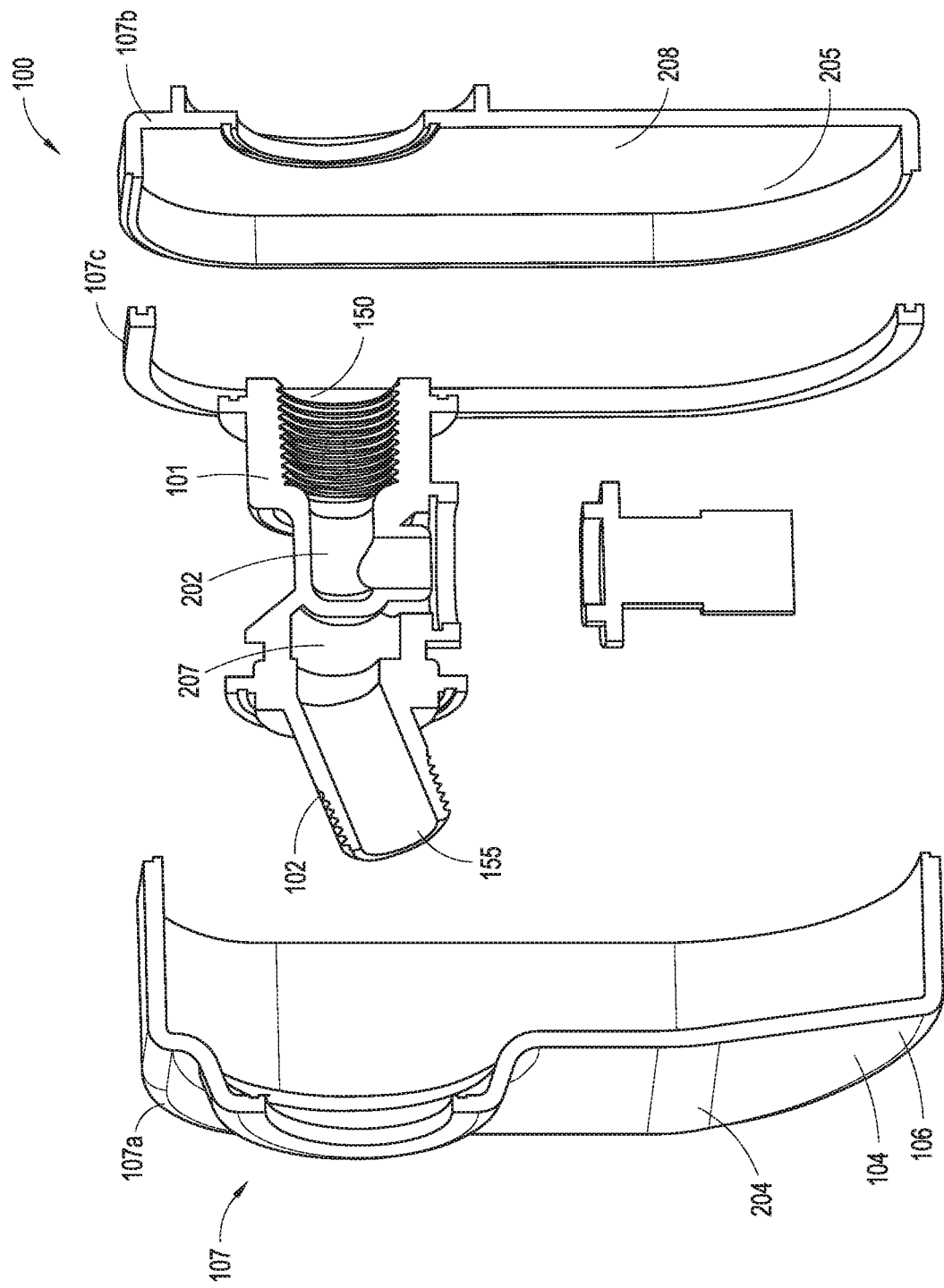
FIG. 3A is an exploded side cross-sectional view of the smart water conservation system of FIG. 1 with a single flow valve, according to some embodiments.
Figure 3B:
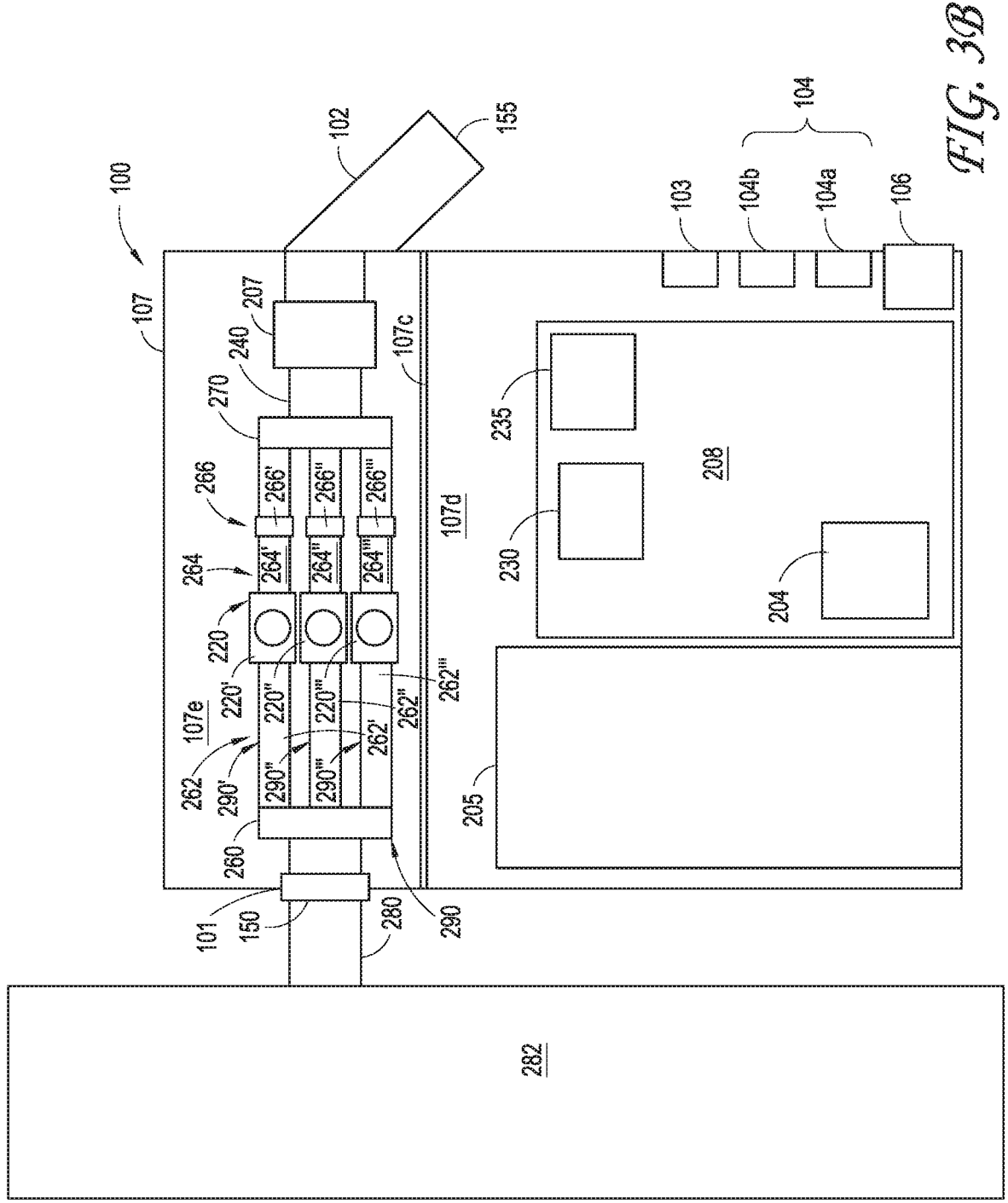
FIG. 3B is a schematic side sectional view of the smart water conservation system of FIG. 1 with multiple flow valves, according to some embodiments.

FIG. 3A is an exploded side cross-sectional view of the smart water conservation system 100 of FIG. 1, according to some embodiments. The smart water conservation system 100 of FIG. 3A comprises a single variable flow valve. FIG. 3B is a schematic side sectional view of the smart water conservation system 100 of FIG. 1, according to some embodiments. The smart water conservation system 100 of FIG. 3B is similar to the system 100 of FIG. 3A, except the system 100 of FIG. 3B comprises multiple flow valves instead of a single variable flow valve (among other differences). Unless otherwise noted, reference numerals and like-named components in FIGS. 3A-3B refer to components that are the same as or generally similar to the components of FIGS. 1 and 2A-2C.

Single Variable Flow Valve Systems

In FIG. 3A, the smart water conservation system 100 includes various features, including an input 150, an output 155, a flow path between the input 150 and the output 155, a variable flow valve 202 positioned in the flow path, an electronic system, a power source 205, and a shell 107. The electronic system can include an indicator system 104, a proximity sensor system 106, a temperature sensor system 207, a wireless receiver 204, and a circuit board 208, among any other suitable feature. For example, in some embodiments, the electronic system can include a timing system and/or usage sensor system. In some embodiments, the system 100 can include one or more pressure sensors to measure the pressure at one or more points in the system 100. In some embodiments, the circuit board 208 can include a controller that is configured to control one or more aspects of how fluid flows through the flow path of the system 100.

In FIG. 3A, the input 150 is configured to receive fluid from an external source (e.g., a shower pipe or other fluid source, e.g., toilet plumbing). In some embodiments, the input 150 can comprise one or more inputs. The output 155 is configured to discharge fluid which passes through the flow path of the system 100. In some embodiments, the output 155 can comprise one or more outputs. In some embodiments, the input 150 can comprise an opening of a shower pipe connector 101. In some embodiments, the output 155 can comprise an opening of a shower head connector 102. The flow path can take any suitable form and take on any suitable shape, such as, for example, the flow path between the input and the output 150, 155 of FIG. 3A. In some embodiments, the flow path can comprise a single unitary pipe. In other embodiments, the flow path can comprise two or more separate pipes that are coupled together.

As shown in FIG. 3A, the shell 107 can include first and second halves 107a, 107b that can be coupled together. In some embodiments, the connection between the first and second halves 107a, 107b can be sealed with a sealing component 107c that prevents water and/or other fluids from getting inside the shell 107 and damaging the internal components. The connection between the first and second halves 107a, 107b can be mechanical, magnetic, and/or the like. Other embodiments with more or less components and/or systems, and/or other input and/or output features are also appreciated, for example, as described above with reference to FIG. 1, among others. As another example, the system 100 of FIG. 3A can include one or more control buttons as described above with reference to FIG. 1. In addition, other orientations and/or arrangements of the components/systems depicted in FIG. 3A are also appreciated. For example, the temperature sensor system 207 can be positioned at any suitable location along the flow path, such as, for example, before the variable flow valve 202 rather than after it. As other non-limiting examples, the proximity sensor system 106 can be positioned at any suitable location (e.g., near the top of the shell 107), the power source 205 can be positioned at any suitable location (e.g., external to the shell 107), and the circuit board 208 can be positioned at any suitable location (e.g., in a different part of the shell 107).

The variable flow valve 202 can comprise any suitable variable flow valve. The variable flow valve 202 can be a one-way flow valve, among others. In some embodiments, the variable flow valve 202 can be a variable solenoid valve. For example, in some embodiments, the variable flow valve 202 can comprise a 2-way or 3-way solenoid valve, although any suitable solenoid valve is appreciated. However, it should be appreciated that the variable flow valve 202 can embody any variable valve capable of controlling the flow of water. For example, the variable flow valve 202 can comprise a ball valve, a gate valve, a check valve, or a proportional valve, among others.

In some embodiments, the variable flow valve 202 can allow different amounts of water to pass through depending on how much the valve is open (or closed). For example, in some embodiments, the position of the valve 202 may range from completely closed, partially open, or completely open. The position of the valve 202 may range from completely closed, partially open, and/or completely open at different times. In some embodiments, the completely closed and completely open positions correspond to approximately 0% and 100% flow, respectively. In some embodiments, the word "approximately" comprises +/−0.5%, although any suitable tolerance is appreciated, such as, for example, anything from +/−0.1% to +/−5%, in addition to lesser and greater tolerances. In other embodiments, approximately 0% and 100% flow may correspond to exactly 0% and 100% flow. Further, the partially open position can correspond to any percentage of flow between approximately/exactly 0% and approximately/exactly 100%, and/or within other suitable percentage ranges and/or tolerances. By increasing the percentage by which the variable flow valve 202 is open (e.g., from 0% to any percentage greater than 0%), the flow rate of the system 100 can be increased. Similarly, by decreasing the percentage by which the variable flow valve 202 is open (e.g., from any percentage greater than 0% to any lesser percentage), the flow rate of the system 100 may be decreased. As discussed above, the maximum flow percentage can be 100% or less.

In some embodiments, the variable flow valve 202 can comprise a step motor valve capable of full flow adjustment control in the range of 0% and 100%. The flow through step motor valve can adjusted between 0% and 100% by any suitable increment, such as, for example, 5%, 10%, 15%, 20%, 25%, or 30%. In some embodiments, the fully closed position can correspond to 0% flow and the fully open position can correspond 100% flow or less. In some embodiments, the flow range of the step motor valve can be between approximately 1.5 and 25 L/min, among others. In some embodiments, the tolerance of the step motor valve can be about 1.0 L/min, among others. In some embodiments, the maximum pressure that the step motor valve can tolerate is 1.75 MPa.

In some embodiments, the amount by which the variable flow valve 202 is opened or closed can be controlled (directly or indirectly) by one or more proximity sensors of the proximity sensor system 106, one or more temperature sensors of the temperature sensor system 207, one or more timers of a timing system (not shown), one or more flow sensors of the water usage system (not shown), and/or a circuit board 208, or any other suitable component and/or system. In these and other ways, the variable flow valve 202 may, in turn, control a plurality of flows, flowrates, and/or water pressures discharged by the output 155, depending on whether the variable valve 202 is closed, partially open, or completely open For example, in some embodiments, the proximity sensor system 106 can determine how far users are standing from the device, which can in turn be used to control the opening size of the variable flow valve 202, thereby effectively increasing and/or decreasing the rate of water flow through the system 100. In some embodiments, the amount that the variable flow valve 202 is opened or closed is controlled by default settings and/or user preferences via a user interface or wireless mobile application, among others, in addition to any measurements and/or processing performed by the system 100.

In the embodiment of FIG. 3A, water can flow through the system 100, for example, from a shower pipe (not shown), past the shower pipe connector 101, through the variable flow valve 202, past the temperature sensor system 207, and into the shower head connector 102, before being released (also referred to as discharged) through a showerhead (not shown) or other output. In some embodiments, turning on a shower that is enhanced with the system 100 is similar in user experience to turning on a shower without the system 100. For example, similar to a normal shower, users can turn on the water and set their desired temperature using one or more shower handles, knobs, or other controls. In some embodiments, the system 100 can automatically turn on (or come out of a relatively low power sleep mode, and/or the like) as soon as water flow is detected. Once the system 100 automatically turns on, the system can automatically connect with the user's mobile phone or other wireless communication device (if within wireless communication range) and pre-load the user's shower preferences. In some embodiments, user preferences can encompass such features as temperature shutoff, proximity sensing flow adjustment, and/or shower time reminders, among any other suitable feature. In some embodiments, the flow through the system 100 when it is turned on is 100% flow (e.g., the variable flow valve 202 is completely open). In some embodiments, the flow through the system 100 when it is turned on is any suitable flow between 0% and 100% (e.g., the variable flow valve 202 is partially open).

For example, in some embodiments, the temperature sensor system 207 can be used to configure a temperature shutoff feature. In some embodiments, one or more temperature sensors of the temperature sensor system 207 can measure (also referred to as sense) the temperature of the water that is flowing through the system 100 and/or that is in the system 100. In some embodiments, when the shower is first turned on, the temperature sensor system 207 can measure the temperature of the water that initially flows through the system 100 until a temperature threshold is satisfied and/or exceeded (also referred to as reached). The temperature threshold can be any suitable temperature threshold, such as, for example, 60, 70, 80, 90, or 100 degrees Fahrenheit, among others, (e.g., any temperature threshold between 50 degrees Fahrenheit and 150 degrees Fahrenheit). Once the temperature threshold is reached, for example, the variable flow valve 202 can be configured to close to terminate the discharge of water out of the system 100. Advantageously, this can reduce the amount of water that is wasted while no one is in the shower. Such flow stoppage can also advantageously serve as a signal to users that the desired temperature has been reached, although other visual and/or audio signals are appreciated as well. For example, when the desired temperature is reached, the system 100 can be configured to make a sound and/or illuminate a light source. In some embodiments, users' phones can be notified of the temperature and/or flow status if it is within Bluetooth or other wireless communication range. In some embodiments, the system 100 can turn back on if the temperature in the system 100 falls by a threshold amount, such as, for example, by five or more degrees Fahrenheit, or any other suitable temperature difference (e.g., 1 degree Fahrenheit, 2 degrees Fahrenheit, 3 degrees Fahrenheit, or 4 degrees Fahrenheit), and can turn back off if the temperature of the water again reaches the temperature threshold. This cycle can repeat itself indefinitely or for a predetermined number of cycles, such as, for example, 1, 2, 3, 4, 5, or more cycles. In some embodiments, the flow rate can be reduced rather than terminated if the water temperature satisfies and/or exceeds a temperature threshold. Advantageously, this can help maintain the water temperature at the threshold temperature while still decreasing the amount of water that is wasted. In some embodiments, reducing the water flow rather than terminating the water flow can prolong the battery life of the system 100 if maintaining the reduced flow rate consumes less energy than repeatedly initiating and terminating flow, whether 100% flow or any suitable flow between 0% and 100%. In some embodiments, the flow can be turned on and off at less than 100% flow, such as, for example, 20%, 30%, 40%, 50%, 60%, 70%, 80%, 90%, and the like. Repeatedly initiating and terminating the flow at less than 100% can also advantageously consume less energy in some embodiments.

In some embodiments, the system can include a water tank to which the system 100 can divert the flow of water until the desired temperature is reached. The water tank can heat the diverted water for later discharge in the shower and/or store it for other purposes (e.g., for a lawn sprinkling system or for toilets, among other uses). The tank can be any suitable size and have any suitable volume. For example, in some embodiments, the volume of the tank can range from 1 gallon to 100 gallons, such as for example, 5 gallons, 10 gallons, less than 5 gallons, less than 10 gallons, or less than 15 gallons, although any suitable volume is appreciated. In some embodiments, one or more tanks can be used. In some embodiments, the tank can be installed under the shower floor or in a wall of the shower, although any suitable position is appreciated.

In some embodiments, the system 100 can include one or more internal heating and/or flow recycling features to heat up the water or heat the water to keep the water in the system 100 at various desired temperatures. For example, in some embodiments, the system 100 can include one or more internal heating and/or flow recycling components to keep the water in the system 100 warm after the temperature sensor system 207 terminated the flow as described above (e.g., when the desired temperature has been reached). For example, in some embodiments, the one or more internal heating and/or recycling components can heat the water in the system 100 until a user activates the system 100 to resume flow after the flow was terminated for reaching the desired temperature. In some embodiments, an internal heating and recycling pipe can be connected to the system 100 that is able to pre-heat and/or keep the water inside the pipe at various desired temperatures after the flow has been terminated by the temperature sensor system 207. The water in the internal heating and recycling pipe can be recirculated when no one is in the shower to keep the water warm. In other embodiments, the system 100 can be configured not to discharge water after the shower has been turned on until a user activates the system 100 to resume the flow after the internal heating and recycling pipe fills with water and heats the water to the desired temperature. This can advantageously allow for zero water (e.g., cold water) to be wasted down the drain while users are waiting for the water to heat up. Further, in some embodiments, the internal heating and recycling pipe can be connected to one or more warming tanks which keep the water at the desired temperature, such as, for example, the one or more water tanks described above. The internal heating and recycling pipe can be any suitable size and be capable of holding/circulating any suitable volume of water. For example, in some embodiments, the volume of the internal heating and recycling pipe can range from 1 gallon to 5 gallons, such as for example, 1, 2, 3, 4, or 5 gallons, although any suitable volume is appreciated, including, for example, less than 1 gallon and less than 10 gallons.

In some embodiments, after the temperature sensor system 207 has terminated the flow of water, the flow of water can resume, or be reactivated, in response to user motion, user input, and/or any other suitable user interface. For example, in some embodiments, flow through the system 100 can resume when the user steps into the shower based on feedback from the proximity sensor system 106, which can comprise one or more proximity sensors. In some embodiments, flow through the system 100 can resume separately from, or in addition to, motion sensor activation.

For example, in some embodiments, flow through the system 100 can resume when the user presses a button before or after stepping into the shower (e.g., control button 103). In some embodiments, the user can alternatively activate flow after temperature shutoff via a mobile application or other control system. For example, in some embodiments, a Bluetooth signal from a mobile application may be configured to turn on the device, among any other suitable signal.

In some embodiments, the temperature shutoff feature of the system 100 can be further configured to include temperature upkeep and temperature safety features, among any other suitable feature. For example, in some embodiments, the system 100 is configured to purge the water being held and/or recirculated by the system 100 after the temperature drops 5 or more degrees Fahrenheit following a temperature shutoff. Other suitable temperature drops are also envisioned, such as, for example, 1 degree Fahrenheit, 2 degrees Fahrenheit, 3 degrees Fahrenheit, or 4 degrees Fahrenheit. During a purge, the system 100 can be configured to automatically resume water flow until the desired temperature is again reached, at which point the variable flow valve 202 can again closed to terminate the discharge of water out of the system 100. In some embodiments, the system 100 can be configured to run purge cycles indefinitely until the user reactivates the flow as described above and can be configured to reach ever decreasing or increasing temperature thresholds after each subsequent and/or series of purges. In some embodiments, the system 100 can automatically perform 1, 2, 3, 4, or 5 purge cycles and then automatically shutoff absent additional user input and/or user activation, although any suitable number of purge cycles is appreciated. In this and other ways, the temperature of the water can be maintained as close to the desired temperature before the user takes a shower while also helping to reduce waste. In some embodiments, the system 100 can be configured to make a sound and/or illuminate a light source to warn the user that a purge is about to be initiated. In some embodiments, users' phones can be notified of the temperature and/or flow status if it is within Bluetooth or other wireless communication range. In some embodiments, the system 100 can be configured to signal that an upcoming purge will be initiated in approximately 60 seconds, 210 seconds, 105 seconds, and/or 5 seconds, among any other suitable length of time, such as, for example, less than 10 seconds, less than 30 seconds, less than 60 seconds, less than 120 seconds, or anything above and below one minute.

In the illustrated embodiment of FIG. 3A, the circuit board 208 can comprise, in some embodiments, a printed circuit board (PCB), a flexible circuit board, or any other suitable circuit board. In some embodiments, the circuit board 208 can comprise a processor configured to control the system 100 and/or the flow of water by electrically interfacing with the variable flow valve 202, the proximity sensor system 106, the temperature sensor system 207, the timer system, and/or the usage sensor system, among other components/systems. In some embodiments, the circuit board 208 interfaces with more or less components/systems, such as, for example, one or more flow sensors, a boost circuit, and/or a voltage regulator. As another example, the circuit board 208 can interface with two or more valves, such as, for example, a plurality of on-off flow valves, such as shown, for example, in FIG. 3B, the system 100 of which is described in further detail below.

In some embodiments, the system 100 can be energized with the power source 205. The power source 205 can comprise a battery, a battery pack, and the like, or any other suitable compact power source. In other embodiments, the power source 205 can be external to the system 100, such as, for example, one or more batteries, an alternating current source (e.g., a home or a generator), and the like, or any other suitable alternating current source. In some embodiments, the power source 205 powers the electrical components of the system 100, such as, for example, the circuit board 208, the indicator system 104, the proximity sensor system 106, the temperature sensor system 207, the usage sensor system, and/or a Bluetooth receiver or other wireless connection or interface. In other embodiments, the power source 205 can power more or less components, such as shown, for example, more valves as shown in the multi-valve embodiment of FIG. 3B. For the systems 100 that have one or more batteries as their power source 205, the one or more batteries can be disposable, replaceable, and/or rechargeable. For the systems 100 that are powered with rechargeable batteries, the system 100 may further comprise a recharging system that is configured to charge the battery as water flows through the system 100. For example, in some embodiments, the system 100 can include an impeller system (e.g., a magnetic impeller system) positioned somewhere in the flow path, or a water turbine positioned somewhere in the flow path. In another embodiment, the system 100 may comprise a solar panel that is configured to charge the power source 205. In yet other embodiments, the system 100 may comprise other technological devices known in the art for charging the power source 205 (e.g., one or more batteries).

In some embodiments, the smart water conservation system 100 is set to completely open the variable flow valve 202 in the rare event that the power source 205 runs out of power, thereby enabling the shower to function like a normal shower until power to the system 100 is restored (e.g., by replacing or recharging the power source 205). The system 100 is also configured to completely open every valve in multiple valve embodiments in the event the power source 205 is completely drained of power. For example, for embodiments with multiple on-off solenoid valves, the standard setting for each of the valves can be open so that if there is an electrical malfunction (e.g., loss of power), the closed valves automatically open. In this way, the shower can function like a normal shower until power to the system 100 is restored (e.g., by replacing or recharging the power source 205). As discussed above, alternative sources of power are also appreciated, such as solar and alternating current, among others. The power level of the system can be tracked via a mobile application or other control or monitoring system. The mobile application or other control or monitoring system can notify the user when the battery is at, for example, 10% and needs to be replaced or recharged. In some embodiments, the system 100 can display the status of the power source 205. For example, in some embodiments, the system 100 can display the percentage of battery life remaining.

The wireless receiver 204 shown in FIG. 3A can comprise a Bluetooth receiver or any other communication channel, wireless connection, and/or interface. In some embodiments, the wireless receiver 204 (e.g., Bluetooth receiver or other wireless controller or interface) enables users to control features of the device such as, for example, the temperature sensor system 207 (e.g., for temperature shutoff, for temperature maintenance, and the like), the proximity sensor system (e.g., for proximity sensing flow adjustment, for proximity sensing flow shutoff, and the like), the timing system (e.g., for one or more timers), the usage sensor system (e.g., for usage sensing flow adjustment, for usage sensing flow shutoff, and the like), and/or an indicator system (e.g., for toggling visual and/or auditory indicators on and off), among others, through an associated mobile application or other communication system. In some embodiments, users can control one or more such features with a user interface comprising one or more control buttons externally positioned on the device (e.g., one or more control buttons 103). In some embodiments, users can control one or more such features via a touch screen display on the device. For example, FIG. 2C illustrates the system 100 in wireless communication with a mobile device or other control system.

Multiple Flow Valve Systems

In FIG. 3B, a schematic side sectional view of the smart water conservation system 100 of FIG. 1 is shown in accordance with some embodiments. As described above, FIG. 3B is similar to FIG. 3A except that FIG. 3B illustrates a multiple valve system 100 as opposed to a single valve system 100. Unless otherwise noted, reference numerals and like-named components in FIG. 3B refer to components that are the same as or generally similar to the components of FIGS. 1, 2A-2C, and 3A. As a result, various features illustrated in FIG. 3B generally function similarly as described and/or illustrated above with reference to FIGS. 1, 2A-2C, and 3A, such as, for example, temperature shutoff and proximity sensing flow adjustment, among others.

In FIG. 2B, the smart water conservation system 100 includes various features, including, for example, an input 150, an output 155, a flow path between the input 150 and the output 155, a plurality of flow valves 220, an electronic system, a power source 205, and a shell 107. Similar to the system 100 of FIG. 3A, the electronic system of FIG. 3B can include an indicator system 104, a proximity sensor system 106, a temperature sensor system 207, a wireless receiver 204, and a circuit board 208, among any other suitable feature. For example, in some embodiments, the electronic system can include a boost circuit 230, a voltage regulator 235, one or more control buttons 103, a timing system, and/or a usage sensor system 240, among others. As discussed above, the proximity sensor system 106 can comprise one or more proximity sensors, the temperature sensor system 207 can comprise one or more temperature sensors, the timer system can comprise one or more timers, and the usage sensor system 240 can comprise one or more usage sensors (e.g., e.g., ultrasonic water meters or any other suitable flow sensor). The indicator system 104 can include one or more visual indicators 104a (e.g., LED(s)) and/or one or more audible indicators 104b (e.g., speaker(s)), although any suitable type of indicator is appreciated.

In some embodiments, the system 100 can comprise more or less components. For example, in some embodiments, the plurality of flow valves 220 can comprise 1, 2, 3, 4, 5, 6, 7, 8, 9, or 10 flow valves, or any other suitable number (e.g., more than 10, more than 20, more than 30, more than 40, more than 50, more than 60, more than 70, more than 80, more than 90, or more than 100 valves). In some embodiments, the number of valves 220 can range in number from 2 flow valves to 100 flow valves or more (e.g., for complex industrial applications or otherwise large scale applications, e.g., university facilities, gym facilities, military facilities (barracks, latrines, etc.), hotel facilities, or manufacturing facilities, among others). As another non-limiting example, in some embodiments, the system 100 can include one or more pressure sensors to measure the pressure at one or more points in the system 100. As another non-limiting example, in some embodiments, the electronic system can also include one or more timers and/or a user interface, among other possible components which help either to conserve water or otherwise control the conservation of water. In some embodiments, the circuit board 208 can include a controller that is configured to control one or more aspects of how fluid flows through the flow path(s) of the system 100.

As shown in FIG. 3B, the shell 107 can define a first compartment 107d and a second compartment 107e which can configured to be coupled together, although any suitable number of compartments is appreciated. In some embodiments, the first compartment 107d can house the mechanical components and the various sensors and the second compartment 107e can house the various electrical features, although any suitable housing arrangement is appreciated. In some embodiments, the connection between the first and second compartments 107d, 107e can be sealed with a sealing component 107c that prevents fluid from getting inside the shell 107 and damaging the internal components. In some embodiments, the sealing component 107c can act as a partition in the event fluid leaks into the first compartment 107d or the second compartment 107e. For example, if a leak occurs in the first compartment 107d or the second compartment 107e, the sealing component can prevent the leaked fluid from leaking into the second compartment 107e or the first compartment 107d, respectively. In some embodiments, the sealing component 107c can have one or more holes for wires to pass through to connect various features of the device to the circuit board 208. The one or more holes in the sealing component can be sealed so that they are watertight. The connection between the first and second compartments 107d, 107e can be mechanical, magnetic, and/or the like.

The flow path in FIG. 3B can take any suitable form and take on any suitable shape, such as, for example, the flow path that is shown between the input and the output 150, 155. In some embodiments, the flow path between the input and the output 150, 155 can include a shower pipe connector 101, a splitting pipe 260, a plurality of input connecting pipes 262, a corresponding plurality of flow valves 220, a corresponding plurality of restricting pipes 264, a corresponding plurality of restrictor valves 266, a corresponding plurality of output connecting pipes 268, a combining pipe 270, and a shower head connector 102. In some embodiments, the input 150 can comprise an opening of the shower pipe connector 101. In some embodiments, the output 155 can comprise an opening of the shower head connector 102. In some embodiments, the flow path can comprise more or less components and/or features. For example, in some embodiments, a flow valve (e.g., on/off flow valve) can be positioned between the input 150 and the input to the splitting pipe 260 in addition to or in lieu of the plurality of flow valves 220. Advantageously, such a flow valve can be used to completely shut off the flow of water through the system 100 without having to control multiple valves. This may be beneficial, for example, if the flow of water through the plurality of flow valves 220 ever needs to be suddenly overridden, shut off, and/or otherwise controlled, such as, for example, if there is a system 100 malfunction or if the water temperature exceeds a maximum threshold. Other combinations of features are also appreciated. For example, in some embodiments, the flow path between the input and the output 150, 155 can include one or more shower pipe connectors 101, one or more splitting pipes 260, one or more input connecting pipes 262, two or more flow valves 220, one or more restricting pipes 264, one or more restrictor valves 266, one or more output connecting pipes 268, one or more combining pipes 270, and one or more shower head connectors 102. In such embodiments, the number of flow valves 220 may not be equal, for example, to the number of flow paths or to the number of restricting valves 266. Any suitable number of components is appreciated. Indeed, it should be appreciated that the flow path can comprise any suitable feature and any suitable number of such feature to achieve the present disclosure as described and contemplated herein.

In some embodiments, a first end of the splitting pipe 260 can connect to a shower pipe 280. The shower pipe 280 can be flush with, or extend a distance from, an opening in a shower wall 282. The splitting pipe 260 can split into two or more second ends to transform a single flow path into a plurality of flow paths (e.g., 2, 3, 4, 5, 6, 7, 8, 9, or 10 or more than 10 flow paths). For example, in the system 100 shown in FIG. 3B, the splitting pipe 260 splits the shower pipe 280 into three flow paths (also referred to as openings) on its second end, although any suitable number of openings is appreciated, such as, for example, 2, 3, 4, or 5 openings, or any number between 2 and 100 openings (e.g., less than 10 openings, less than 20 openings, less than 30 openings, less than 40 openings, less than 50 openings, less than 60 openings, less than 70 openings, less than 80 openings, less than 90 openings, less than 100 openings, 2 openings, or 100 openings), or any other suitable number.

As shown in FIG. 3B, in some embodiments, the splitting pipe 260 can split the shower pipe 280 into three flow paths 290', 290", 290''' which can sequentially flow through the three corresponding flow valves 220', 220", 220''' and the three corresponding restrictor valves 266', 266", 266''', respectively. In some embodiments, the plurality of connecting pipes 262 attach between and link to the splitting pipe 260 and the plurality of flow valves 220. In some embodiments, the restricting pipes 264 attach between and link to the plurality of flow valves 220 and the combining pipe 270. In some embodiments, each restricting pipe 264', 264", 264''' includes a restrictor valve 266 (e.g., 266', 266", 266''').

The combining pipe 270 can combine the plurality of flow paths that emanate from the splitting pipe 260 back into single flow path before the flow path transitions into the output 155 (e.g., the output 155 has one opening). For example, in some embodiments, the combining pipe 270 can combine the three flow paths 290', 290", 290''' back into a single flow path (e.g., back into a single pipe), although any suitable number of recombinations is appreciated. For example, in some embodiments, the number of flow paths 290 created by the splitting pipe 260 can be decreased to any lesser plurality of flow paths before the flow path transitions into the output 155 (e.g., the output 155 has fewer openings than the discharge end of the splitting pipe 260). In some embodiments, the number of flow paths 290 created by the splitting pipe 260 can be increased to any greater plurality of flow paths before the flow path transitions into the output 155 (e.g., the output 155 has more openings than the discharge end of the splitting pipe 260). In some embodiments, the number of flow paths 290 created by the splitting pipe 260 may not be increased or decreased by the time the flow path transitions into the output 155 (e.g., the output 155 has the same number of openings as the discharge end of the splitting pipe 260).

In the embodiment of FIG. 3B, water can flow, for example, from the shower pipe 280, past the shower pipe connector 101, into the splitting pipe 260, through the plurality of connecting pipes 262, into and past the plurality of flow valves 220, through the plurality of restricting pipes 264, past the plurality of restrictor valves 266, through the combination pipe 270, out and past the usage and temperature sensor systems 240, 207, and into the showerhead connector 102, before being released (also referred to as discharged) through a showerhead (not shown) or other output. However, in the embodiment of FIG. 3B, it should also be appreciated that the plurality of flow valves 220', 220", 220''' can be controlled such that water can flow through fewer than all three of the flow paths 290', 290", 290''', such as, for example, only through flow paths 290' and 290", only through flow paths 290' and 290''', only through flow paths 290" and 290''', only through flow path 290', only through flow path 290", or only through flow path 290'''. In some embodiments, various features of the system 100 may be positioned along different points of the flow path or at different locations within the shell 107. For example, in some embodiments, the usage sensor temperature sensor systems 240, 207 can be positioned at a different position along the flow path. For example, the temperature sensor system 207 can be placed at the entrance to the splitting pipe 260. In some embodiments, the usage sensor system 240 can be placed at the entrance to the splitting pipe 260.

The plurality of flow valves 220 shown in FIG. 3B can comprise any suitable valve. The plurality of flow valves 220 can be one or more one-way flow valves, among any other type of suitable valve. In some embodiments, the plurality of flow valves 220 can comprise one or more solenoid valves (e.g., on-off solenoid valves, among others). A variety of solenoid valves can be used, such as, for example, 2-way solenoid valves, 3-way solenoid valves, and the like, or some combination thereof. However, it should be appreciated that the plurality of flow valves 220 can embody any type of valve capable of controlling the flow of water. For example, in addition to on-off solenoid valves, one or more of the plurality of flow valves 220 can comprise a flip-flop valve, ball valve, a gate valve, or a plug valve, among others, and in any combination thereof.

In some embodiments, one or more of the plurality of flow valves 220 can comprise an on-off flow valve (e.g., an on-off solenoid valve). As the name implies, in some embodiments, an on-off flow valve can be either always on or always off. An on-off flow valve can be normally fully open, normally partially open, and/or normally closed when on or off (also referred to as energized or not energized, and energized or de-energized). For example, in some embodiments, aside from the time it takes to open or close, an on-off flow valve can be either fully open or fully closed when on or off. Similarly, in some embodiments, aside from the time it takes to open or close, an on-off flow valve can be either partially open or fully closed when on or off. For example, in some embodiments, one or more on-off valves can be used that open or partially open from a normally closed position when energized or de-energized. Similarly, in some embodiments, one or more on-off valves can be used that close from a normally open or partially open position when energized or de-energized. The default position for some or all of the plurality of valves can be normally fully open, normally partially open, or normally closed when energized or not energized. In some embodiments it may be beneficial to use one or more on-off solenoid valves that are normally open (whether fully or partially) when not energized so that the shower may function like a normal shower if there is a loss of power (e.g., the battery dies or there is a power outage). For example, during a power loss, always off valves that are normally open or partially open would open from any closed position they were in, if any, when the power loss de-energizes them, thereby permitting water to still flow through the system 100. In some embodiments it may be beneficial to use one or more on-off solenoid valves that are normally closed when not energized so that the flow through the system 100 can automatically terminate if there is a loss of power and/or a malfunction of the system 100. For example, in some embodiments, at least one of the plurality valves 220 is a normally closed valve. In some embodiments, the at least one normally closed valve can be positioned, for example, between the input 150 and the input to the splitting pipe 260 as discussed above.

In some embodiments, one or more of the plurality of flow valves 220 can comprise a flip-flop valve which only requires energy when opening or closing the valve (i.e., it does not take energy to keep the valve open or to keep the valve closed). For example, in some embodiments, one or more flip-flop valves can be used to reduce the amount of power that the system 100 consumes. For example, one or more flip-flop valves can be used with, for example, one or more on-off valves, although any suitable combination of valves is appreciated.

In some embodiments, one or more of the plurality of flow valves 220 can comprise a four mode angle adjustable electronic ball valve. The four modes can correspond to four flow percentages. For example, in some embodiments, the four modes can correspond to 0% flow, 30% flow, 60% flow, and 100% flow, although any suitable percentages are appreciated. Other percentages can include, for example, mode 1-mode 2-mode 3-mode 4 percentages of 0%-15%-30%-50%, 0%-40%-60%-80%, 0%-50%-65%-85%, or 0%-50%-75%-100%, among others. In some embodiments, mode 1 and mode 4 correspond to fully closed and fully open valve positions, respectively. In some embodiments, the flow range of the step motor valve can be between approximately 1.5 and 25 L/min, among others. In some embodiments, the tolerance of the step motor valve can be about 1.0 L/min, among others. In some embodiments, the maximum pressure that the step motor valve can tolerate is 1.0 MPa. In some embodiments, the four mode angle adjustable electronic ball valve can be adjusted to any suitable flow percentage between 0% and 100%.

In some embodiments, one or more of the plurality of flow valves 220 can comprise a step motor valve capable of full flow adjustment as described above.

In some embodiments, each of the plurality of flow valves 220 can independently allow fluid (e.g., water) to pass through when open. In some embodiments, open valves can allow 100% of a flow to pass through the valve orifice and closed valves can allow 0% of a flow to pass through the valve orifice. In such embodiments, one or more flow valves in multiple valve systems 100 (e.g., 220', 220", 220''') can be configured to simply turn on and off the flow of fluid through their corresponding flow paths (e.g., 290', 290", 290'''). However, the amount of flow that each flow valve turns on, and which represents 100% through each particular valve, may be different from valve to valve as a result of various factors, such as, for example, (1) the presence of a flow adjustment mechanism downstream from the valve (e.g., one or restrictor valves such as the restrictor valves 266', 266", 266'''), (2) the variable opening size of the of the valve (e.g., the extent of its opening size), (3) the variable sizes of the connecting pipe(s) 262 (e.g., the connecting pipes 262', 262", 262'''), (4) the variable sizes of the restricting pipes 264 (e.g., the restricting pipes 264', 264", 264'''). In these and other ways, the amount of flow through each valve can be varied in multiple valve embodiments, thereby controlling the amount of discharge through the output 155.

For example, in some embodiments, the amount of flow that the plurality of flow valves 220 control may be adjustably set (also referred to as tuned) with the restricting valves 266. The restricting valves 266 can be removably coupled to the restricting pipes 264. In some embodiments, the restricting valves 266 can set the percentage of flow through open (or partially open) flow valves 220 by changing the diameter along the length of, or a portion of the length of, one or more of the restricting pipes 264, or at least cause that effect, and/or by changing the diameter of one or more of the flow valves 220. In some embodiments, the diameter (and/or other feature) of the plurality of flow valves 220 and/or the one or more restricting valves 266 may be configured to be automatically adjusted in response to signals received from the circuit board 208 (e.g., from a controller) to change the flowrate through one or more of the flow paths 290. The adjustment(s) to the plurality of flow valves 220 and/or the one or more restricting valves 266 can, in turn, have an effect on the flowrate through one or more of the flow paths 290. For example, in some embodiments, one or more features (e.g., a diameter) of the restricting pipes 264 can be adjusted in response to a change in its corresponding restricting valve 266. It should be appreciated that the restricting valves 266 and/or the restricting pipes 264 can take on any suitable number of diameters (and/or other features). For example, in some embodiments, the diameter of restricting pipes 264 and/or the restrictor valves 266 can range from approximately 0.01000 inches to approximately 0.10205 inches, although other suitable range is appreciated, such as, for example, from approximately 0.005 inches to approximately 0.200 inches, from approximately 0.0050 inches to approximately 0.2000 inches, or from approximately 0.00500 inches to approximately 0.20000 inches, among others. In other embodiments, it should be appreciated that the restricting valves 266 can set the percentage of flow through the plurality of flow valves 220 in ways other than, or in addition to, adjusting one or more diameters of the restricting valves 266 and/or the corresponding restricting pipes 264.

In addition to the different flowrates that can be achieved through the plurality of flow valves 220 by varying the number of flow paths via the splitting pipe 260 and by opening and closing the plurality of flow valves, the different flow percentages through the plurality of flow valves 220 can be controlled by using one or more restrictor valves 266. That is, while the plurality of flow valves 220 can be configured to control the flow (e.g., turn the flow on or off), the set of corresponding restrictor valves 266 can be configured to control the flowrate that the plurality of flow valves 220 turns on and off. For example, the restricting valves 266', 266", 266''' shown in FIG. 3B may be set to let in 25%, 50%, and 75% of the flow, respectively, when their corresponding flow valves 220', 220", 220''' are open (e.g., fully or partially), although any other suitable percentages are also envisioned.

The plurality of flow valves 220 may be opened or closed, or turned on and off, in any combination, such as, for example, individually, cooperatively, and/or collectively, to allow different percentages of water flow through the output 155, which may correspond to different flowrates and/or water pressures. Indeed, it should be appreciated that any number of valves can be turned can be opened and closed in any combination, such, as, for example, a number in the range of 2 flow valves to 100 flow valves as discussed above. In some embodiments, a showerhead or other suitable output device can be fluidically attached to the output 155. In some embodiments, each flow valve of the plurality of flow valves 220, when open (fully or partially), may control a different percentage of flow to the output 155. For example, in FIG. 3B, where the restricting valves 266', 266", 266''' are set to let in 25%, 50%, and 75% of the flow diverted by the splitting pipe 260, respectively, turning on and off the plurality of flow valves 220', 220", 220'" in different combinations, such as, for example, individually, cooperatively, and/or collectively, can create varying flows discharged by the output 155. In some embodiments, the various percentages of water flow discharged by the showerhead may result from one or more flows assimilated by the combining pipe 270. That is, in some embodiments, the water percentages that flow out of the output 155 may be an assimilation of one or more of the plurality of flows 290 (e.g., 290', 290", 290'") controlled by the plurality of flow valves 220, the individual flowrates of which can be regulated by the corresponding restricting valves 266, if any (e.g., 266', 266", 266'").

In some embodiments, the number of assimilated flows capable of being delivered to an output 155 (e.g., showerhead) directly depends on the number of flow valves 220 that the system 100 has and on the number of flow valves 220 that the system 100 and/or users can control. For example, in some embodiments, systems 100 with, for example, 2 valves, 3 valves, 4 valves, or 5 valves may deliver 2 assimilated flows, 3 assimilated flows, 4 assimilated flows, or 5 assimilated flows, respectively, and so on. For example, in three valve embodiments, the percentage of flow through a shower head may be 100%, 66%, 45%, and 20%, although any other suitable percentages are appreciated as well, such as, for example, 100%, 70%, 40%, and 10%, among others. As described above, in some embodiments, the combination of the different assimilated flows 290 (e.g., any combination or sub combination of the flow paths 290', 290", 290'") discharged by the showerhead can depend on the flowrates set by the restrictor valves 260, the combination of the plurality flow valves 220 that are open and closed (e.g., any combination or sub combination of valve openings of the plurality of flow valves 220', 220", 220'"), and the resultant combination of these different flows, flowrates, and/or water pressures by the combining pipe 270. In other embodiments, more or less flows 290 may be assimilated from multiple valve embodiments, such as, for example, multiple valve embodiments with at least one variable flow valve. Further in some embodiments, multiple splitting pipes 260 and multiple combining pipes 270 can be used along with any suitable combination of flow valves, restricting valves, and/or any other suitable flow path mechanism to further vary the flowrates being discharged by the output 155, thereby giving the user more flow options.

As described in more detail below with reference to FIG. 2C, the assimilated flows discharged by a showerhead can be triggered based on what zone (also referred to as area) of the shower users are in. For example, in some embodiments, the assimilated water flow percentages 100%, 66%, 45%, and 20% can be delivered when users are positioned in zones 1, 2, 3, and 4, respectively, although any suitable percentage in each zone is appreciated. For example, in some embodiments, the zones can be positioned in reverse order such that the strongest flow is activated when the user positioned farthest from the output 155 or the system 100 and the weakest flow is activated when the user is positioned closest to the output 155 or the system 100. This reverse orientation can be beneficial, for example, for users who typically stand close to the showerhead and want to save more water. Other zone arrangements are also appreciated. For example, in some embodiments, a user in zone 2 or zone 3 can trigger the strongest or weakest flow.

The ability to turn on multiple flow valves in different combinations in conjunction with the ability to adjust flow rates via one or more restrictor valves advantageously gives users extensive control over the flow(s) discharged from the system 100, even when variable flow valves are not used. For example, in some embodiments, the opening and closing of the plurality of flow valves 220 can be controlled by a proximity sensor system 106, a temperature sensor system 207, a timing system, a usage sensor system 240 (e.g., one or more flow sensors), and/or a circuit board 208, as will be described in more detail below. In these and other ways, a plurality of flow valves (e.g., the plurality of flow valves 220) may, in turn, individually, cooperatively, and/or collectively control a plurality of flows that are assimilated by one or more combining pipes (e.g., the combining pipe 270) and discharged by a showerhead. For example, in some embodiments, the proximity sensor system 106 can determine how far a user is standing from the device and, based at least partially on the determined distance, control the opening and closing of the plurality of flow valves 220 (e.g., a plurality of on-off solenoid valves), thereby increasing or decreasing the amount and rate of water flow discharged by the showerhead. In some embodiments, the plurality of valves 220 that are opened or closed can additionally and/or alternatively be controlled by default settings and/or user preferences via a user interface or wireless mobile application, among others.

In some embodiments, one or more variable flow valves (e.g., variable flow valve 202) can be used in addition to, and cooperatively with, one or more different types of non-variable flow valves (e.g., on-off solenoid valves capable of fully open and/or one or more partially open positions) to achieve various percentages of water flow through an output 155. Regardless of how multiple valves are combined, the use of multipole valves can create the illusion of a single variable flow valve by varying the flows and flowrates through the different valves and their associated flow paths. Advantageously, adding one or more variable flow valves to multiple valve embodiments can give systems 100 more intricate, or minute, flow control capability. In some multiple valve embodiments, the plurality of flow valves 220 can be, for example, all variable flow valves. For example, in some embodiments, the plurality of flow valves 220 in FIG. 3B can be variable flow valves of the type described above with reference to FIG. 3A (e.g., variable flow valve 202). In multiple valve embodiments in which one or more variable flow valves are used, one of ordinary skill in the art will appreciate that the restrictor valves 266 can be used in conjunction with the one or more variable flow valves, although one of ordinary skill in the art will likewise appreciate that the restrictor valves 266 may not need to be used in conjunction with the one or more variable flow valves. Since multiple valves can be combined as discussed above to create the illusion of a single variable flow valve, one or more valves can be combined to effectively create variable flow at the output 155 (e.g., a showerhead). Indeed, in some embodiments, one or more valves can be combined that have various restrictions of water flow (e.g., system 100 in FIG. 3B). For example, in some embodiments, the system 100 can include three flow valves (e.g., three on-off solenoid valves), each having a different flow restriction associated therewith. As discussed above, in some embodiments, the different flow restrictions can be implemented with one or more restrictor valves. However, any suitable flow restriction device, method, arrangement, feature, system, and the like is appreciated.

In some embodiments, multiple valve embodiments require less power to operate than embodiments having a single variable flow valve (e.g., the multiple valve system 100 of FIG. 3B compared to the single variable flow valve system 100 of FIG. 3A). As a result, controlling multi-valve embodiments can advantageously consume less power during operation than controlling a single variable flow valve. This is because variable flow valves, while able to beneficially provide a spectrum of flowrates and/or water pressures along a continuum from 0% to 100% as described above, typically require a lot of power to operate whenever in use. For example, in some embodiments, it can take a significant amount of energy to not only change the position of a variable flow valve, but also to keep the variable flow valve in the new position. Advantageously, the use of multiple flow valves (e.g., two or more) can decrease the power draw/requirements of the system 100 and can also increase its energy efficiency. For example, the plurality of valves in multiple valve embodiments can collectively consume less power. As another example, the plurality of valves can be collectively operated in ways that consume less power as compared to the operation of single variable flow valves. As described above, the plurality of valves 220 shown in FIG. 3B can be low powered on-off solenoid valves, or any other suitable type of low powered valve(s) (e.g., flip-flop valve(s)). In some embodiments, the multiple valves in FIG. 3B can be individually, cooperatively, and/or collectively controlled such that less power is consumed, irrespective of whether the multiple valves comprise variable flow valves, low powered on-off solenoid valves, or some combination thereof (e.g., if the variable flow valve(s) used have smaller power requirements than those used in single variable flow valve embodiments). Having multiple valves not only enables the system 100 to have flow control without having to use a variable flow valve, it also makes available more resourceful and diverse power management techniques. Accordingly, in battery powered multi-valve embodiments, the battery life of the device may be slightly or even dramatically increased as compared to the battery life for single variable flow valve embodiments.

Electrical Aspects of the Present Disclosure

As described above with reference to FIGS. 3A and 3B, the electronic system of the system 100 can include an indicator system 104, a proximity sensor system 106, a temperature sensor system 207, a wireless receiver 204, and a circuit board 208, among any other suitable feature. In some embodiments, the electronic system can include a boost circuit 230, a voltage regulator 235, one or more control buttons 103, a touch screen, a timing system, and/or a usage sensor system 240, among others. As discussed above, the proximity sensor system 106 can comprise one or more proximity sensors, the temperature sensor system 207 can comprise one or more temperature sensors, the timer system can comprise one or more timers, and the usage sensor system 240 can comprise one or more usage sensors (e.g., e.g., ultrasonic water meters or any other suitable flow sensor).

System Control Based on User Input

As described above, in some embodiments, a mobile device or other wireless communication interface can be used to control the system 100. In some embodiments, the mobile device or other wireless communication interface can be external to the system 100 (e.g., not mechanically or electrically coupled to the system 100). In some embodiments, the mobile device or other wireless communication interface can control any feature of the system 100. FIG. 4 is a process flowchart 400 between an external control device 410 and the systems 100 of FIGS. 1-3B, according to some embodiments. The process flowchart of FIG. 4 illustrates an example process 400 for controlling the systems 100 described and contemplated herein using an external control device 410. In various embodiments, the process 400 can include any number of the following steps, including more or fewer of the following steps, and in any suitable order. In some embodiments, the external control device 410 can be a smartphone, tablet computer, smart watch, desktop computer, home automation controller, and/or the like, although any suitable external control device is appreciated. For example, in some embodiments, the external control device can be the mobile device shown in FIG. 2C. It should be noted, however, that in some embodiments, some or all of the user inputs may be included in or on the systems 100 in lieu of or in addition to being part of an external device 410. In some embodiments, some or all of the user inputs may be mechanically and/or electrically connected to the systems 100.

As shown in FIG. 4, the process 400 starts at block 412. The process 400 continues in block 414, where an external control device 410 receives input from a user. In some embodiments, the user input can be a desired flow rate, desired temperature, desired conservation rate, desired comfort level, an indication that a flow should start, stop, increase, decrease, and/or the like, among any other suitable input. Upon receipt of the user input at block 414, the external control device 410 processes the user input at block 416. Upon processing of the user input at block 416, the external control device 410 generates one or more instruction commands at block 418 for transmission to a water conservation system 100 at block 420. The generation of the instruction command can be automatic upon receipt and processing of the user input, or can include further interaction with the user, or another device, etc. The one or more generated instructions can further include, for example, an instruction to adjust one or more temperature thresholds, one or more flowrates, and/or one or more time and water usage alarms, among others.

FIG. 4 includes a dashed horizontal line between the external control device 410 and the system 100. In some embodiments, the processes above the dashed line are indicative of processes that can be performed by the external control device 410 and the processes below the dashed line are indicative of processes that can be performed by the system 100. It should be appreciated that the system 100 can be separate from the external control device 410, and that the processes described with respect to FIG. 4 are examples for reference only. For example, in some embodiments, the external device 410 and the system 100 can form a single physically integrated system. As another example, in some embodiments, the external device 410 and the system 100 can be connected by one or more wires.

In some embodiments, the system 100 receives the one or more instruction commands generated in block 420 at block 422. Upon receipt of the one or more generated instruction commands at block 422, the system 100 processes the one or more instruction commands at block 424. Upon processing of the one or more instruction commands at block 424, one or more features of the system 100 are adjusted at block 426 based on the one or more instruction commands processed in block 424. In some embodiments, the one or more features can include, for example, temperature shutoff, proximity sensing flow adjustment, and/or timing and water usage indicator goals, among any other suitable feature. The adjustment of features such as these can be automatic upon receipt and processing of the one or more instruction commands, or can include further interaction with the user, or another device, etc. Upon adjustment of the various features at block 426, the water conservation system may generate confirmation and/or a current status output at block 428. In some embodiments, the system 100 can perform any number of suitable processes in a similar or dissimilar order. For example, in some embodiments, the system 100 can perform more, fewer, different, and/or differently ordered processes, and can include interaction between multiple electronic devices (e.g., between a display and/or buttons physically integrated with the water conservation system), among any other suitable process and/or device arrangement.

In some embodiments, the external control device 410 can optionally receive confirmation and/or a current status input (e.g., generated as an output) from the system 100 at block 430. The external control device 410 can optionally display the confirmation and/or current status input at block 432. In some embodiments, the process ends at block 434. Of course, any suitable process with any number of steps in any suitable order may be possible and is appreciated. In some embodiments, any suitable number of systems, devices, components, and/or features can be used.

Temperature Sensor System

Figure 5:
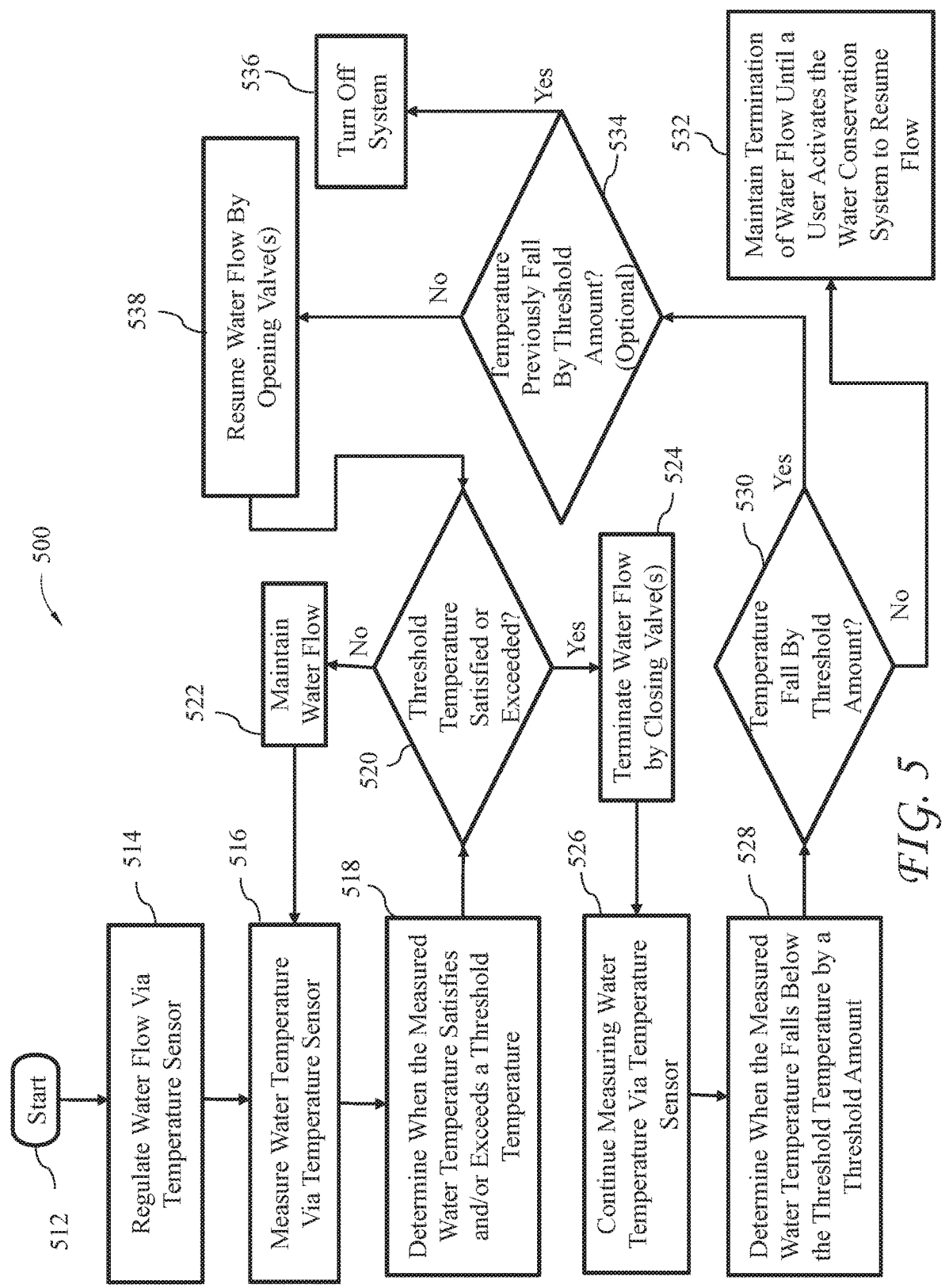
FIG. 5 is a process flowchart for regulating the flow of water through the systems of FIGS. 1-3B with a temperature sensor system, according to some embodiments.

FIG. 5 is a process flowchart 500 for regulating the flow of fluid (e.g., water) through the systems 100 described and contemplated herein with the temperature sensor system 207 of FIGS. 1-3B, according to some embodiments. The process flowchart of FIG. 5 illustrates an example process 500 for controlling the systems 100 described and contemplated herein with one or more temperature sensors of the temperature sensor system 207. In various embodiments, the process 500 can include any number of the following steps, including more or fewer of the following steps, and in any suitable order.

As shown in FIG. 5, the process 500 starts at block 512. The process 500 continues in block 514, where one or more temperature sensors of the temperature sensor system 207 can be used by the system 100 to regulate the flow of water by measuring the water temperature at block 516. Upon measuring the water temperature at block 516, the system 100 determines when the measured water temperature satisfies and/or exceeds a threshold temperature at blocks 518 and 520. If the threshold is not satisfied and/or exceeded at block 520, the system 100 maintains the flow of water at block 522 and continues to measure the water temperature at block 516 as shown. However, if the threshold is satisfied and/or exceeded at block 520, the system 100 terminates the flow of water by closing one or more valves at block 524 and continues to measure water temperature at block 526 as shown. Upon terminating the water flow at block 524, the system 100 determines when the continued temperature measurements at block 526 fall by a threshold amount at block 528 and 530, for example, by five or more degrees Fahrenheit, or any other suitable temperature difference (e.g., 1 degree Fahrenheit, 2 degrees Fahrenheit, 3 degrees Fahrenheit, or 4 degrees Fahrenheit). If the temperature has not fallen by the threshold amount, the system 100 maintains the flow termination at block 532 until a user activates the water to resume flow, such as, for example, stepping into the shower and activating the flow via the proximity sensor system 106 and/or by entering a user input, among other ways. However, if the temperature has fallen by the threshold amount, the system 100 can resume the flow of water by opening one or more valves at block 538 and return to block 520, or can optionally first determine whether the temperature has previously fallen by the threshold amount at block 534. In some embodiments, at block 534, if the temperature has fallen by the threshold amount, for example, two previous times, the system powers down at block 536, although any number of times is appreciated (e.g., one or more times). In some embodiments, the process ends at block 536. In some embodiments, if the temperature has not fallen by the threshold number of times (e.g., two times or one or more times), the system can resume the flow of water by opening one or more valves at block 538 and return to block 520. In some embodiments, the process ends when a user is in the shower and/or when a user turns off the shower. In some embodiments, the system 100 can perform any number of suitable processes in a similar or dissimilar order. For example, in some embodiments, the system 100 can perform more, fewer, different, and/or differently ordered processes, and can include interaction between multiple electronic devices (e.g., between a display and/or buttons physically integrated with the water conservation system), among any other suitable process and/or device arrangement.

The system 100 can also be configured to terminate the flow of water if the water temperature exceeds a preset and/or user preferred temperature threshold. For example, in some embodiments, the variable flow valve 202 can be closed to terminate the flow of water when the temperature is 105 degrees Fahrenheit or higher. Other suitable temperature thresholds are also appreciated, such as, for example, greater than 100 degrees Fahrenheit, greater than 110 degrees Fahrenheit, and the like. The system 100 can also be configured to prohibit flow reactivation following a temperature shutoff if the water temperature exceeds the preset and/or user preferred threshold. In such embodiments, the system 100 can be configured to give the user an indicator warning to exit the shower and/or turn the temperature down when the water temperature exceeds the temperature threshold. In some embodiments, the flow rate can be reduced rather than terminated if the water temperature exceeds a temperature threshold. Advantageously, this can help maintain the water temperature at the threshold temperature while still decreasing the amount of water that is wasted.

In some embodiments, the sensitivity of the temperature sensor system 207 can have different ranges depending on the temperature sensor(s) used. For example, in some embodiments, the temperature sensor(s) can detect temperature changes down to +/−0.1 degrees Fahrenheit, although any suitable sensitivity is appreciated, such as, for example, +/−0.2, +/−0.3, +/−0.4, +/−0.5, less than +/−1.0, or less than +/−2.0 degrees Fahrenheit, among others.

Proximity Sensor System

In some embodiments, the proximity sensing flow adjustment aspect of the system 100 can be implemented with one or more proximity sensors of the proximity sensor system 106. In some embodiments, the one or more proximity sensors can be configured to detect a user's physical presence and/or absence near and around the device. For example, in some embodiments, the proximity sensor system 106 can be configured to detect a user's distance from the system 100 and/or from any point of flow associated with the system 100. To accomplish this, in some embodiments, the one or more proximity sensors can have an inner sensitivity and an outer sensitivity. The inner sensitivity (also referred to as an inner range) can be approximately 0.25 meters and the outer sensitivity (also referred to as an outer range) can be approximately 2.5 meters, although any suitable sensitivities are appreciated. For example, in some embodiments, the inner sensitivity can be approximately 0.004 meters, 0.01 meters, 0.1 meters, 0.2 meters, 0.3 meters, 0.4 meters, 0.5 meters, more than 0.25 meters, less than 1.0 meters, and the like. In some embodiments, the outer sensitivity can be approximately 4.5 meters, 4.0 meters, 3.5 meters, 3.0 meters, 2.9 meters, 2.8 meters, 2.7 meters, 2.6 meters, more than 1.5 meters, less than 3.5 meters, less than 4.0 meters, less than 4.5 meters, and the like. Other inner and outer sensitivities are also appreciated.

In some embodiments, the inner and outer sensitivities can define the effective range of the proximity sensor system 106. In some embodiments, the proximity sensor system 106 can have a plurality of inner and/or outer sensitivities. In some embodiments, the inner and outer sensitivities can be varied and/or adjusted during use based on any suitable feature and/or input (e.g., water temperature, flow rate, shower duration, water usage, user input, and the like). In some embodiments, one or more objects within the range of the proximity sensor system 106 can be ignored (also referred to as disregard) if the proximity sensor has been configured to not detect it. For example, in some embodiments, the proximity sensor system 106 can be configured to ignore objects which have one or more dimensions that are less than one or more threshold dimensions. The one or more threshold dimensions can be any suitable threshold dimension, such as, for example, less than 0.1 meters. In some embodiments, the proximity sensor system 106 can be configured to ignore objects if they have been mapped by the proximity sensor system 106, such as, for example, during a calibration routine. For example, in some embodiments, the proximity sensor system 106 can initiate a calibration routine when first turned on (or anytime thereafter) to map the dimensions of the shower in addition to any other objects in the shower (e.g., soap shelves, shower seats, shampoo bottles, soap bottles, and the like). This can advantageously reduce or eliminate false readings by the proximity sensor system 106.

In some embodiments, any object beyond the range of the outer sensitivity can be ignored because the proximity sensor does not detect it (since the object is beyond the sensor's outer effective range). For example, in some embodiments, the outer sensitivity can be set so that the walls of a shower are not detected by the proximity sensor system 106. Advantageously, this can ensure that one or more walls of the shower do not disturb the proximity sensor system 106, by, for example, causing false readings. In this way, the walls of the shower can be effectively ignored by the proximity sensor system 106. For example, in some embodiments, the outer sensitivity can be set to 2.5 meters so that one or more walls of the shower (e.g., the wall(s) farthest from the point of flow) are not detected by the proximity sensor system 106.

In some embodiments, the proximity sensor system 100 can comprise one proximity sensor. In some embodiments, the proximity sensor system 100 can comprise a plurality of proximity sensors. For example, in some embodiments, the proximity sensor system 100 can comprise 3 proximity sensors, although any suitable number is appreciated (e.g., 1, 2, 3, 4, 5, 6, 7, 8, 9, 10, or more sensors, such as, for example, less than 100 sensors). In some embodiments, one or more of the proximity sensors can comprise an ultrasonic distance sensor, although any suitable proximity sensor is appreciated, such as, for example, infrared sensors, laser sensors, radar sensors, sonar sensors, inductive sensors, and the like, or any combination thereof. As described above, the proximity sensors can detect any suitable distance from the system 100 and/or from one or more points of flow associated with the system 100. In some embodiments, the proximity sensors can detect a user's proximity over any suitable angle range. The angle range of a proximity sensor represents the detection span covered by the proximity sensor. For example, in some embodiments, the angle range of the one or more proximity sensors can be any angle between 1 degree and 360 degrees, such as, for example, 30 degrees, 45 degrees, 50 degrees, 70 degrees, 180 degrees, and 270 degrees, although any suitable angle range is appreciated. In embodiments with one proximity sensor, the angle range forms a single cone in which the proximity sensor system 106 can detect distance. In embodiments with a plurality of proximity sensors, the angle ranges can form one or more overlapping cones in which the proximity sensor system 106 can detect distance. The proximity sensors can be positioned so that the cone(s) point in one or more overlapping directions, thereby expanding the total angle range over which the proximity sensor system 106 can detect a user's proximity. The proximity sensors can be positioned to tighten the tolerance within any single cone as well. For example, in some embodiments, two proximity sensors with the same angle range but different inner and outer sensitivities and/or different tolerances can be pointed in the same direction (or at the same focal point). In this way, the effective range of the device can be advantageously expanded and the detection capabilities can become more accurate. It should be appreciated that any suitable number of proximity sensors can be positioned in any suitable arrangement.

The one or more proximity sensors (e.g., ultrasonic distance sensor) can, for example, function in temperatures (e.g., detect temperatures) ranging from approximately −10 degrees Celsius to approximately 60 degrees Celsius or from approximately 0 degrees Celsius to 100 degrees Celsius, although any suitable temperature range is appreciated (also referred to as the working temperature range). In some embodiments, the one or more proximity sensors can accurately detect distances to within +/−3 mm, +/−10 mm, or any suitable tolerance within the range of +/−1 mm to +/−0.5 meters. In some embodiments, the one or more proximity sensors can accurately detect distances to within +/−4% of the actual distance or any suitable tolerance within the range of +/−1% to +/−20% of the actual distance.

In some embodiments, the one or more proximity sensors can be configured with one or more temperature compensation features, as will be appreciated by one of ordinary skill in the art. For example, in some embodiments, one or more of the proximity sensors can be temperature dependent such that the sensor only detects objects having a temperature (e.g., surface temperature) within a certain temperature range (e.g., less than or greater than 37 degrees Celsius). The temperature dependence of the sensor can be digitally compensated, for example, by using a temperature sensor (e.g., a temperature sensor external to the system 100).

In some embodiments, one or more proximity sensors of the proximity sensor system can be positioned inside and/or outside of the system 100. For example, in some embodiments, at least one proximity sensor is positioned within the shell 107 of the system 100. In some embodiments, at least one proximity sensor is positioned outside of the shell 107 of the system 100. For example, in some embodiments, the proximity sensor system 106 can include a proximity sensor positioned on a wall outside of the system 100 (also referred to as a wall sensor). The wall sensor can be positioned across from the system 100, although any suitable position is appreciated. For example, in some embodiments, the wall sensor can be mounted on the wall opposite the wall to which the system 100 is mounted and be connected to the system 100 via a wire or via wireless communication. Advantageously, the wall sensor can be used to avoid the disturbance caused by the water flow being discharged from the system 100. By avoiding the disturbance caused by water flow, a more accurate distance reading of the user can be detected. The wall sensor can avoid this disturbance because its detection cone does not pass through the discharge stream before detecting the user. In some embodiments, one or more proximity sensors can be positioned inside the system 100 near the top of the shell 107 to similarly reduce the amount of water flow disturbance by aiming the one or more proximity sensors such that their detection cones do not intersect the discharge stream. Other arrangements of the proximity sensor system 106 are also appreciated. For example, in some embodiments, the proximity sensor system 106 can include multiple wall sensors. In some embodiments, one or more proximity sensors can be positioned on one or more walls. When wall sensors are used, the proximity sensor system 106 can detect how far a user is from the wall sensor or how close a user is from the wall sensor.

In some embodiments, the proximity sensor system 106 can include a sensor receiver positioned on the wall opposite to which the proximity system 106 is positioned. The sensor receiver can be used to fix the length of the shower, thereby increasing the accuracy of the proximity sensor system 106. Without the sensor receiver, the length of the shower can fluctuate (and cause false readings) since signals emitted by the proximity sensors can reflect back and forth between the front and back walls of the shower whenever users move out of the detection cone(s) of the sensors (e.g., the beam(s) of the sensors). Whenever users duck out of the way of the sensor beam to pick up soap or to shave their legs, or whenever users turn sideways, there is a risk of false readings since the users oftentimes move out of the way of the beam(s) of the sensor(s) when making these types of movement. The sensor receiver can advantageously eliminate these types of false readings by calibrating the length of the shower. For example, in some embodiments, the system 100 can calibrate the length of showers to be a threshold distance such that the system 100 does not detect objects greater than the threshold distance even if the outer sensitivity of the proximity sensor being used is greater than this threshold distance. For example, in some embodiments, the system 100 can calibrate the length of a shower to be 2.5 meters such that the system 100 does not detect objects greater than 2.5 meters from the system 100, as measured from the wall to which the system 100 is mounted. It should be appreciated that any suitable threshold distance is appreciated.

In some embodiments, the one or more proximity sensors can be configured to have environmental immunity for things such as, for example, false triggers from steam and water from the shower head, among others.

In some embodiments, proximity data from the proximity sensor system 106 can be transmitted to a controller and/or to a valve system of the device (not shown). In this way, the proximity sensor system 106 can be used to adjust the amount of water flowing through the system 100 based on a user's position relative to the system 100 (e.g., a reference point on the system 100 or a point of flow associated with the device, e.g., the showerhead or other output).

In operation, once a user is detected in the shower (or other application), the proximity sensor system 106 can be configured to control (e.g., adjust) the flowrate and/or water pressure based on the one or more user proximities detected. In this way, the flowrate and/or water pressure discharged by the system 100 can be dynamically varied, limited only by the sensitivity of the one or more proximity sensors and the capabilities of the one or more flow valves (e.g., the variable flow valve 202 and/or the plurality of flow valves 220). Alternatively or additionally, in some embodiments, the proximity sensor system 106 can be configured to separate the shower into a plurality of different zones (e.g., two or more) and discharge different flowrates and/or water pressures to each of the plurality of different zones depending on which zone the user is in and/or activates. In this way, the flowrate and/or water pressure discharged by the system 100 can be controlled in varied increments (e.g., discrete increments) that are at least as large as the sensitivity of the one or more proximity sensors.

As discussed above, FIG. 2B is a perspective view of the smart water conservation system of FIG. 1 with a shower head attached in the context of a shower area, according to some embodiments. In some embodiments, the shower area can be separated into one or more zones (also referred to as areas or regions). As shown in FIG. 2B, in some embodiments, the shower area can be broken up into four zones (e.g., zones 1, 2, 3, and 4), although any number of suitable zones is appreciated. For example, in some embodiments, the shower area can be separated into 2, 3, 5, 6, or more zones. In some embodiments, the proximity sensor system 106 can be configured to determine what zone users are positioned in. For example, as described in more detail below, a user's position relative to the system 100 can trigger (also referred to as activate) various flows and/or flowrates to be discharged from the system 100, among other flow properties. In some embodiments, one or more flow properties can be associated with one or more zones. For example, in some embodiments, users can trigger various flows and/or flowrates based on what zone they are in, as determined by the proximity sensor system 106. In some embodiments, the one or more flow properties associated with one or more of the zones can change as the length of the shower increases. For example, in some embodiments, the flowrate associated with one or more of the zones can slowly decrease as the time of the shower increases. In some embodiments, the one or more zones can be uniformly or non-uniformly divided up. In some embodiments, the one or more zones can be customized by users.

In some embodiments, the proximity sensor system 106 can be configured to control (e.g., adjust) the flowrate and/or water pressure according to the zone the user is in. For example, in some embodiments, the system 100 can be configured to allow a different percentage of water flow (e.g., by opening or closing one or more valves) depending on what zone the system 100 detects the user is in. For example, in the embodiment of FIG. 2B, each zone of the plurality of zones can be set to a different percentage of water flow. As users move forward and/or backward into and out of the different zones, the flow of water can be controlled and/or throttled according to user preferences and/or the settings of the system 100. In some embodiments, two or more of the zones may be set to the same percentage of water flow, although any suitable flow arrangement is appreciated. In embodiments without zones, the flow of water can be dynamically adjusted based on the user's distance from the system 100 as discussed above. In such embodiments, the user's distance can be determined along a continuum and/or along one or more discrete distances from the system 100. In some embodiments, the water flow percentages can be controlled by a single variable flow valve (e.g., the variable flow valve 202 as shown in FIG. 3A) or by multiple valves (e.g., the plurality of flow valves 220 shown in FIG. 3B).

In some embodiments, the water flow percentages in the plurality of zones can be optimized so as not to be effected by user actions such as turning sideways or momentarily bending over, among other user actions. In some embodiments, the proximity sensor system 106 can be configured with one or more delays and/or delay algorithms to reduce or eliminate the number of flowrate adjustments in response to user movement artifacts (e.g., movements that do not change the zone the user is in). Examples of movement artifacts include, for example, intra-zone user movements and user movements that momentarily stretch across two or more zones. In some embodiments, the system 100 can be pre-installed with delay settings to assure that the user's experience is the best as possible. In some embodiments, the one or more proximity sensors of the system 100 use a delay algorithm to assure that whenever a user is moving around in the shower that the system 100 does not erratically change the flow, does not change the flow when the user does not want it to change, and/or does not change the flow when the user was not expecting it to change. In some embodiments, the one or more delays and/or delay algorithms comprise default time cushions that can be customized by the user by, for example, one or more user interfaces.

In some embodiments, the system 100 in FIGS. 1-3B can be configured to give different priority to the different zones whenever the one or proximity sensors detect activation of two or more zones simultaneously. For example, in some embodiments, the zone(s) associated with lower flow rates may be given priority over the zone(s) associated with higher flowrates and vice versa. In some embodiments, the system 100 can be configured to make sounds and/or illuminate light sources to indicate when a user's position is straddling two or more zones or when the system 100 detects that a user's position is producing an error. In some embodiments, users' phones may be notified if their detected position is occupying two or more zones simultaneously if it is within Bluetooth or other wireless communication range, although any suitable user interface is appreciated.

The flowrates and/or water pressures corresponding to embodiments with zones can have default settings and/or can be customizable or otherwise adjustable. For example, in some embodiments, the zone layout and the water flow percentages for each of the different zones in the zone layout can have default settings, but may also be controlled and/or customized by a mobile application or other user interface or control system. In some embodiments, users can adjust and/or calibrate the plurality of zones. In some embodiments, there can be preset zone arrangements for both standard tub showers (approximately 2 meters long) and smaller standing showers (approximately 1.5 meters long). In some embodiments, users can customize the zones with, for example, a drag and drop feature of a mobile application, or any other suitable user interface.

For example, in some embodiments, the system 100 can detect what zone the user is in and what the user is doing by using one or more proximity sensors, and based on this, can adjust the flowrates discharged by the system 100 accordingly. For example, in some embodiments, when a user is directly under the shower head (e.g., rinsing shampoo out of their hair), the water flow may be 100%, giving the user a comfortable and powerful shower when they need it; when the user backs away from the shower head (e.g., scrubbing their body or applying soap), the water flow may be 50%, saving water while still keeping the user warm and comfortable; when the user steps even further away (e.g., grabbing soap or shaving their legs), the water flow may be reduced to 20%, saving even more water.

The default settings for the four zones in FIG. 2B can be, for example, 100% flow in zone 1, 80% flow in zone 2, 60% flow in zone 3, and 25% flow in zone 4, with zone 4 positioned furthest from the shower head. Other suitable default settings are also appreciated, such as 100%, 70%, 40%, and 15% for zones, 1, 2, 3, and 4, respectively, among others. In some embodiments, the user can customize the number of zones and the water flow percentages associated with each. In some embodiments, the flow percentages in the different zones can be controlled by a variable flow valve (e.g., the variable flow valve 202 of FIG. 3A). For example, in some embodiments, the different flow percentages can be controlled by a variable flow valve that is partially open and/or completely open at different times. In other embodiments, the flow percentages in the different zones can be controlled by multiple flow valves (e.g., the plurality of flow valves 220 of FIG. 3B). For example, in some embodiments, the different flow percentages can be controlled by opening and closing two or more valves in different combinations.

In some embodiments, if a user has customized presets, these will override, or take precedence over, the default zone settings when the system 100 is turned on. In some embodiments, the system 100 can be configured to make sounds and/or illuminate light sources to indicate which zone is currently activated. For example, when zone 1, 2, 3, or 4 is activated in FIG. 2B, for example, the system 100 may make 1, 2, 3, and 4 beeps, respectively, and/or display 1, 2, 3, and 4 LED lights, respectively. In some embodiments, users' phone may be notified of the zone that is activated with a message (e.g., a visual, an audio, and/or a text message) if it is within Bluetooth or other wireless communication range and indicated, although any suitable user interface is appreciated. Moreover, in some embodiments, various visual and audio zone indications may be used to help users calibrate the zones.

Allowing users to customize the zones and corresponding flowrates can help assure that the system 100 is universally compatible. For example, when using smaller showers than the one shown in FIG. 2B (e.g., smaller than a standard 6 foot tub), the user can adjust the zones to be smaller to accommodate and more accurately track the user. In other embodiments, the system 100 can be adjusted to accommodate larger showers than is shown in FIG. 2B (larger than a standard 6 foot tub). In some embodiments, the system 100 can be adjusted to work alongside one or more other like systems, such as, for example, in settings where multiple showerheads are in close proximity (e.g., gyms, military barracks, hotels, and the like, among others). In some embodiments, the zone adjustment feature can be used when installing the device in non-traditional mounting positions such as, for example, ceiling mounted showers where zones are no longer applicable so that the system 100 turns on when a user is beneath the shower and turns off when the user is not beneath the shower (e.g., within one or more detection cones of the proximity sensor system 106). In some embodiments, the ability to customize the zones allows users to become more involved with their conservation effort. For example, during droughts a user may acquire the gravitas to further conserve water and, for example, adjust one or more zones and associated flowrates of the system 100 accordingly.

Figure 6:
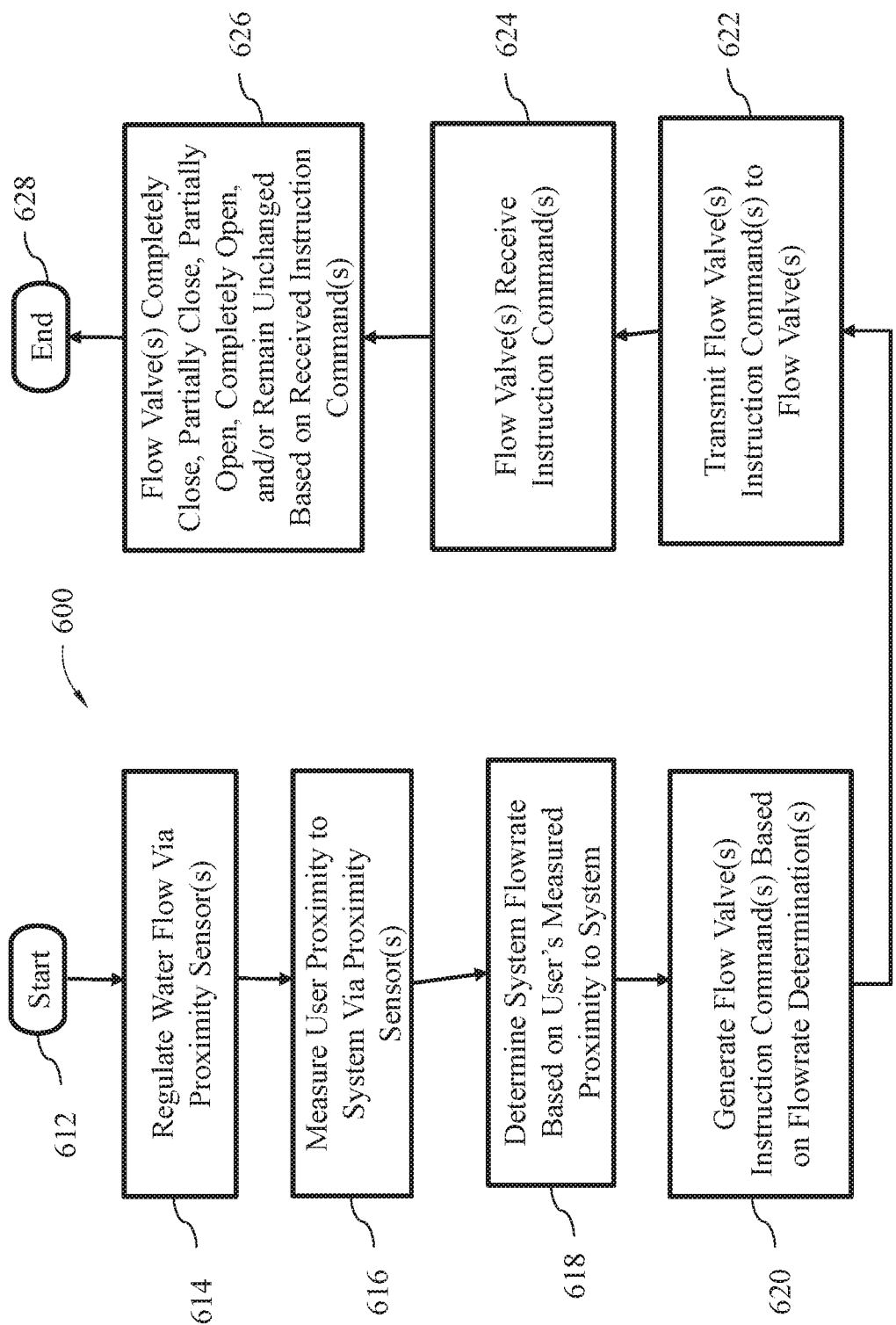
FIG. 6 is a process flowchart 600 for regulating the flow of water through the systems of FIGS. 1-3B with a proximity sensor system, according to some embodiments.

FIG. 6 is a process flowchart 600 for regulating the flow of fluid (e.g., water) through the systems 100 described and contemplated herein with the proximity sensor system 106 of FIGS. 1-3B, according to some embodiments. The process flowchart of FIG. 6 illustrates an example process 600 for controlling the systems 100 described and contemplated herein with one or more proximity sensors of the proximity sensor system 106. In various embodiments, the process 600 can include any number of the following steps, including more or fewer of the following steps, and in any suitable order.

As shown in FIG. 6, the process 600 starts at block 612. The process 600 continues in block 614, where one or more proximity sensors of the proximity sensor system 106 can be used by the system 100 to regulate the flow of water by measuring (also referred to as detecting) the user's distance (also referred to as proximity) to the system 100 at block 616. Upon measuring user proximity at block 616, the system 100 determines the flowrate at block 618. Upon determining the flowrate, the system 100 generates flow valve instruction commands at block 620 and transmits the instruction commands to one or more flow valves at block 622. At block 624, the one or more flow valves receive the instruction commands. Upon receipt of the instruction commands, the one or more flow valves completely close, partially close, partially open, completely open, and/or remain unchanged at block 626. In some embodiments, the process ends at block 628. In some embodiments, the system 100 can perform any number of suitable processes in a similar or dissimilar order. For example, in some embodiments, the system 100 can perform more, fewer, different, and/or differently ordered processes, and can include interaction between multiple electronic devices (e.g., between a display and/or buttons physically integrated with the water conservation system), among any other suitable process and/or device arrangement.

Timer and Usage Systems

In some embodiments, the systems 100 described and contemplated herein can include a timer system. In some embodiments, the timer system can be configured to measure elapsed time (e.g., the length of a shower). In some embodiments, the timer system can comprise one or more timers. In some embodiments, the timer system can produce or otherwise trigger various indicator alarms (e.g., visual and/or audible) after certain amounts of time have elapsed, such as, for example, 60 seconds, 90 seconds, 120 seconds, 150 seconds, 180 seconds, 210 seconds, and the like. In some embodiments, the timer system can measure real time.

In some embodiments, users can use a mobile application or any other suitable user interface to set a shower length goal using the timer system. In some embodiments, the system 100 may then remind users when they are approaching and/or when they have exceeded their shower length goal via one or more indicator alarms (e.g., visual and/or audio). In some embodiments, the timer system can be configured so that users can set water usage goals. In some embodiments, water usage can be measured, for example, with one or more flow sensors. In such embodiments, the system 100 may remind users with one or more indicator alarms (e.g., visual and/or audio) when their water usage goal is approaching and/or when the goal has been exceeded. The one or more indicator alarms (also referred to as warnings) can be auditory and/or visual. For example, in some embodiments, the system 100 can activate an audio and/or visual indication at 60 seconds before the goal, 30 seconds before the goal, at the goal, 20 seconds after the goal, 60 seconds after the goal, and the like, although any suitable time relative to the goal is appreciated. In some embodiments, the indication(s) may include 1 flash and/or 1 beep, 2 flashes and/or 2 beeps, and 3 flashes and/or 3 beeps, respectively, and may further include extended single flashes and/or beeps every 30 seconds beyond the user's goal that last 4 to 5 seconds each, and which can be distinctive from the flashes and/or beeps indicated before the goal has been reached. In some embodiments, one or more LEDs can be used as illumination light sources for the one or more flashes. Other suitable audio and visual indicating signals are also appreciated, such as, for example, studder of water flow or product vibration, among others. In some embodiments, the timer system of the system 100 can be controlled by the mobile application. In some embodiments, the indication(s) can be one or more alarms on the mobile application and/or mobile device. The mobile application can measure showering habits and estimated water conservation based on flow volume and time. In some embodiments, the mobile application can gradually reduce users' shower length or water usage goals daily to give users time to adjust to taking showers with less water. For example, in some embodiments, users can enter one or more future goals, such as, for example, 5 minutes and/or 8 gallons. If the user is currently taking 8 minute showers and using 14 gallons of water, the system 100 can gradually decrease the daily goal over a period of time until the 5 minute or 8 gallon goal is achieved, adjusting the one or more indicator alarms accordingly. In some embodiments, the Bluetooth receiver or other wireless controller or interface enables a user to control the timer and/or LED light system through an associated mobile application, any other system, or any other user interface system.

Overview of System Operation

As described above, in some embodiments, turning on the shower can turn on the system 100. Alternatively or additionally, in some embodiments, users can press a control button (e.g., control button 103) to power the system 100 on. In some embodiments, the indicator system 104 can make a beep sound for 0.5 seconds when the system 100 is powered on. In some embodiments, the one or more flow valves can be fully or partially open when the system 100 is powered on.

As described above with respect to the temperature sensor system 207, in some embodiments, the one or more valves of the system 100 (e.g., the variable flow valve 202 or the plurality of flow valves 220) can remain fully or partially open when the system 100 is initially powered on until a threshold temperature is reached (e.g., 37 degrees Celsius), after which the one or more valves of the system 100 can be closed until the user reactivates the flow. In some embodiments, the indicator system 104 can make a beep sound for 2 seconds and the proximity sensor system 106 can be turned on when the threshold temperature is reached. As described above, in some embodiments, the effective range of the proximity sensor system 106 can be, for example, 0.25 meters to 3.0 meters.

In some embodiments, the indicator system 104 (e.g., a display with a plurality of LEDs) can show which zone of the system 100 is currently activated (e.g., zone 1, 2, 3, or 4). In some embodiments, and as described above, the indicator system 104 can make a beep sound (e.g., with a speaker) and illuminate a light source (e.g., with one or more LEDs) to warn of the amount of time left.

In some embodiments, users can turn off the system 100 by turning off the shower. In some embodiments, users can press the control button to power off the system 100. In some embodiments, the indicator system 104 can make a beep sound for 0.5 seconds when the system 100 is powered off. In some embodiments, users need to hold the control button for at least one second to turn the system 100 off, although any suitable length of time is appreciated (e.g., 0.5 seconds, 1.5 seconds, 2.0 seconds, and the like).

Other Features, Components, and Systems

The flow adjustment aspect of the system 100 can be implemented in any suitable way. For example, as described above, the flow adjustment aspect of the system 100 can be implemented with one or more flow adjustment systems, such as, for example, a temperature sensor system 207, a proximity sensor system 106, a timer system, and/or a water usage system, among others. Systems such as these can work together to achieve the effect of variable flow. However, other flow adjustment systems are also appreciated, such as, for example, a hand pull, a foot pedal, and/or a sensor floor mat, although any suitable flow adjustment system is appreciated. In some embodiments, these other flow adjustment systems can be used to control the flow of water through the system 100 in addition to or in lieu of using one or more of the flow adjustment systems described above. For example, in some embodiments, rather than using one or more proximity sensors from the proximity sensor system 106 to determine a user's position relative to the system 100 and/or one or more points of flow associated with the system 100, another flow adjustment system can be used (e.g., the hand pull, the foot pedal, and/or the sensor floor mat).

In some embodiments, a hand pull can be used. The hand pull can be, for example, a hand pulley chain or any other suitable type of hand pull. The hand pull can be coupled to the system 100 to control the flow of water being discharged from the system 100. In some embodiments, the hand pull can be coupled to the one or more flow valves of the system 100. In some embodiments, the hand pull can be electrically connected to a controller of the system 100 which can in turn control the one or more flow valves of the system 100. By using a hand pull, the flow rate of the system 100 can be manually varied. For example, in some embodiments, the hand pull can be pulled to control any suitable flow rate percentage and/or any suitable number of flow rates as described above. The hand pull (e.g., hand pulley chain), for example, can have four flow settings (e.g., 0%, 30%, 60%, and 100%). The flow settings can be associated with, for example, the number of times the hand pull is pulled and/or the length of the hand pull (e.g., the length of the hand pulley chain). For example, in some embodiments, one pull can activate 0% flow, two pulls can activate 30% flow, three pulls can activate 60% flow, and four pulls can activate 100% flow, although any suitable pull arrangement is appreciated, such as, for example, sequential pulling (e.g., the first pull can activate 0% flow, the second pull can activate 30% flow, the third pull can activate 60% flow, and the fourth pull can activate 100% flow. In some embodiments, the length of the hand pull can control (e.g., vary) the flow rates that are activated. The length of the hand pull can vary between a minimum and a maximum length such as for example, 0.1 meters to 0.4 meters, among others. The four flow settings of 0%, 30%, 60%, and 100% can be associated with any suitable length of the hand pull (e.g., 0.1, 0.2, 0.3, and 0.4 meters, respectively). In some embodiments, the hand pull can "click" when the next or preceding flow rate has been activated. In some embodiments, the hand pull can be used to manually control the flow percentage in the range of 0% to 100%. For example, the flow settings ranging from 0% flow to 100% flow can be associated with various lengths of the hand pull, with 0% associated with 0.1 meters and 100% associated with 0.4 meters. The lengths between 0.1 meters and 0.4 meters can activate any suitable flow percentage. Advantageously, having a hand pull attached either wirelessly or wired to the system 100 can allow users to easily vary and/or override the flow of the system 100 and adjust the flow according to their preference.

In some embodiments, a foot pedal can be used to manually vary the flow rate of the system 100. The foot pedal can vary the flow of the system 100 similar to that of the hand pull. For example, in some embodiments, the foot pedal can have one or more positions associated with one or more flow settings. As another example, the flow settings of the system 100 can be associated with, for example, the number of times the foot pedal is depressed (also referred to as steps) and/or the extent of the pedal depression (e.g., the angle of the foot pedal). For example, in some embodiments, one step can activate 0% flow, two steps can activate 30% flow, three steps can activate 60% flow, and four steps can activate 100% flow, although any suitable step arrangement is appreciated, such as, for example, sequential stepping as described above with respect to sequential pulling. In some embodiments, the angle at which the foot pedal is depressed can control (e.g., vary) the flow rates that are activated. The angle of the depression can vary between a minimum and a maximum angle such as for example, 0 degrees to 60 degrees, among others. The four flow settings of 0%, 30%, 60%, and 100% can be associated with any suitable angle of the foot pedal (e.g., 60, 45, 30, and 0 degrees, respectively). In some embodiments, the foot pedal can "click" when the next or preceding flow rate has been activated. In some embodiments, the foot pedal can be used to manually control the flow percentage in the range of 0% to 100%. For example, the flow settings ranging from 0% flow to 100% flow can be associated with various angle depressions of the foot pedal, with 0% associated with 60 degrees and 100% associated with 0 degrees. The angles between 60 degrees and 0 degrees can activate any suitable flow percentage. As for hand pulls, having a having a foot pedal attached either wirelessly or wired to the system 100 can advantageously allow users to easily vary and/or override the flow of the system 100 and adjust the flow according to their preference. In some embodiments, the foot pedal can be suctioned to the shower floor, although any suitable attachment is appreciated.

In some embodiments, a flow switch akin to a dimmer switch can be used to manually vary the flow rate being discharged by the system 100. The dimmer switch can activate any suitable flow rate. The dimmer switch can be used to activate any number of flow rates. For example, the dimmer can be used with multiple valves to activate four flow rates and/or can be used with a variable flow valve to activate any flow rate in the range of 0% to 100%, among others (e.g., 0% to 80%). As for hand pulls and foot pedals, having a having a flow switch can advantageously allow users to easily vary and/or override the flow of the system 100 and adjust the flow according to their preference.

In some embodiments, a sensor floor mat can be used to vary the flow rate being discharged by the system 100. The sensor floor mat can be attached either wired or wirelessly to the system 100. In some embodiments, the sensor floor mat can sense the proximity of the user by where they are stepping on the mat, thereby advantageously allowing for less false readings from the discharged water, steam, and/or any other interference in the shower (e.g., objects and/or walls in the shower). In some embodiments, the sensor floor mat can detect a user's proximity with one or more weight sensors, although any suitable method of detection is appreciated. In some embodiments, the sensor floor mat can be used to sense water flow, water temperature, and/or more in depth analytics of shower and/or water usage. In some embodiments, the sensor floor mat can include one or more water reservoirs (also referred to as a tank). The water reservoir can, for example, be used as a storage tank and/or a grey water recycling tank. For example, if a user uses biodegradable soaps, grey water recycled in the one or more reservoirs can be used for flushing toilets, watering plants, and/or cleaning exterior landscapes, although any suitable grey water use is appreciated. Advantageously, users' shower water usage can be reduced to zero and/or almost to zero (i.e., the amount of water wasted down the drain can be reduced to zero and/or almost to zero).

In some embodiments, the flow adjustment aspect of the system 100 can be implemented on a hand shower (e.g., a mobile showerhead). For example, in some embodiments, one or more proximity sensors can be attached to the head of a hand shower to detect a user's proximity in much the same way as described above with respect to the proximity sensor system 106 implemented in traditional wall mounted showers. In some embodiments, the handle of the mobile shower head can have a touch sensor (e.g., a capacitive touch sensor, among any other type of suitable touch sensor). The touch sensor can turn on and off the flow of water through the head of the hand shower when, for example, users grab and let go of the handle. In some embodiments, users can activate larger flow percentages by touching more of the sensor at any given time. For example, touching the sensor in the range of approximately 0% of its surface area to approximately 100% of its surface area can activate flowrates in the range of approximately 0% to approximately 100%, respectively. In some embodiments, touching the sensor within different percentage ranges of its surface area can activate one or more flows. For example, in some embodiments, touching the sensor in the ranges of 0% to 15%, 30% to 45%, 60% to 75%, and 85% to 100% of its surface area can activate flow rates of approximately 20%, approximately 40%, approximately 65%, and approximately 100%, respectively, although any suitable flow rate regime is appreciated (e.g., 15%, 30%, 50%, and 85%, among others). In some embodiments, a plurality of sensors can be used. For example, in some embodiments, users can activate larger flows by touching more sensors simultaneously. The hand shower can include, for example, four touch sensors (among any other suitable number). In some embodiments, touching one sensor can activate 20% flow, touching two sensors can activate 45% flow, touching three sensors can activate 75% flow, and touching four sensors can activate 100% flow. In some embodiments, touching the first sensor can activate 20% flow, touching the first two sensors can activate 45% flow, touching the first three sensors can activate 75% flow, and touching all four sensors can activate 100% flow (e.g., four sensors aligned in a straight line). In some embodiments, touching one or more sensors can activate 0% flow, advantageously allowing users to turn off the flow of water without having to let go of the showerhead hand. In some embodiments, the handle of the mobile shower head can have a thermal sensor, although any other suitable sensor capable of detecting a user's presence within a portion of the flow path is appreciated. In some embodiments, the one or more sensors attached to the hand shower can be attached to the hand shower in addition to or in lieu of the proximity sensor system 106 attached to the system 100 described above. In some embodiments, the proximity sensor system attached to the hand shower (e.g., one or more proximity sensors, one or more touch sensors, one or more thermal sensors, and/or the like) can be powered off when the hand shower is positioned in its wall mount (or other mount) so that the system 100 can function as described above. In some embodiments, the proximity sensor system 106 can be powered off (also referred to as deactivated) and the proximity sensor system attached to the hand shower (e.g., one or more proximity sensors, one or more touch sensors, one or more thermal sensors, and/or the like) can be powered on and take over when the hand shower is removed from its wall mount (or other mount).

Electrical System

Figure 7:
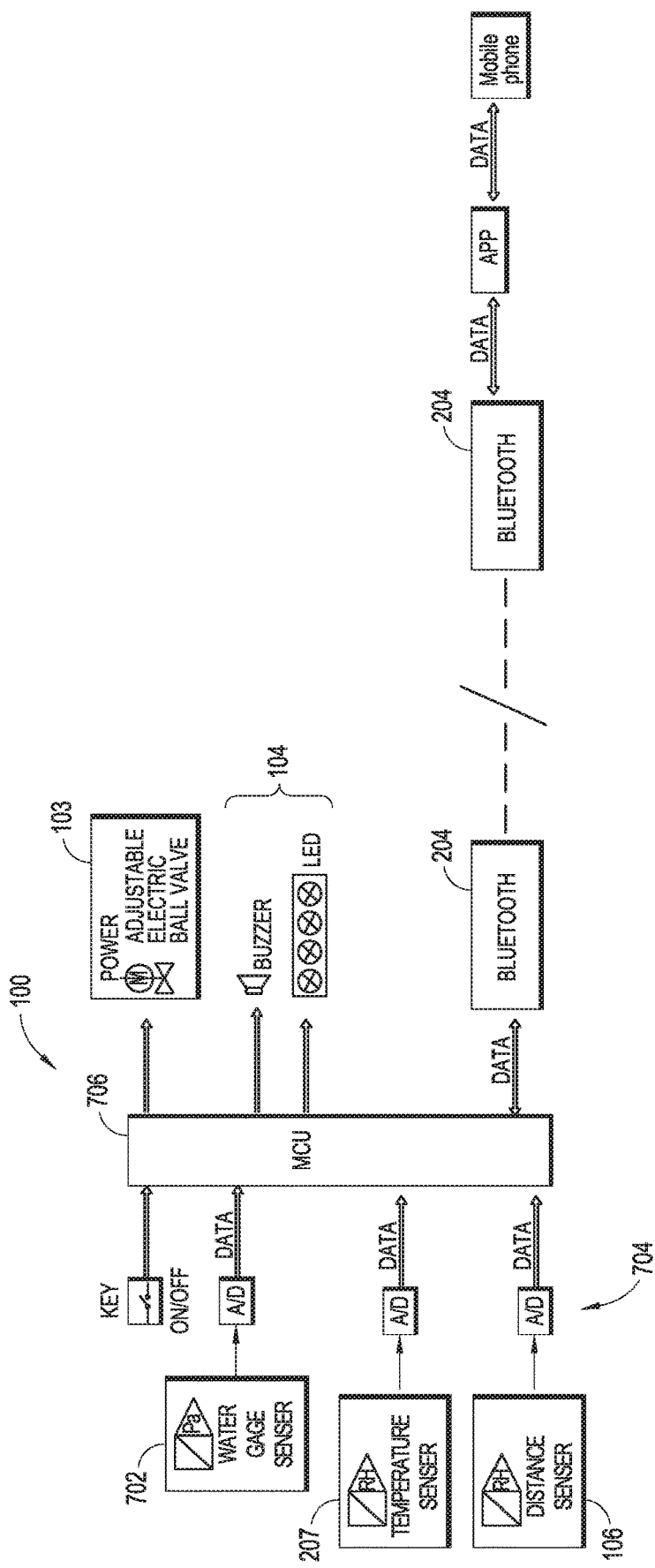
FIG. 7 is an electronic schematic of the smart water conservation system of FIGS. 1-3B, according to some embodiments.

FIG. 7 is an electronic schematic of the smart water conservation systems 100 of FIGS. 1-3B, according to some embodiments. Unless otherwise noted, reference numerals and like-named components in FIG. 7 refer to components that are the same as or generally similar to the components of FIGS. 1-6. As a result, various features illustrated in FIG. 7 generally function similarly as described and/or illustrated above with reference to FIGS. 1-6, such as, for example, temperature shutoff and proximity sensing flow adjustment, among others.

In FIG. 7, the electronic schematic of the system 100 includes various features, including, for example, a proximity sensor system 106, a temperature sensor system 207, and a water usage system 702. The system 100 can include a controller 706 that can receive signals from one or more sensors of the proximity sensor system 106, the temperature sensor system 207, and the water usage system 702, although it is appreciated that the controller 706 can be configured to receive signals from any suitable system. The system 100 can include a plurality of analog-to-digital converters 704 as shown. The controller 706 can be, for example, a microcontroller unit (MCU). In some embodiments, the controller 706 can be in communications with a control button 103, an indicator system 104, and a wireless receiver 204. The wireless receiver can connect with various user interfaces (e.g., users' mobile phones). As described above, in some embodiments, the system 100 can have more or less components. Any suitable electronic schematic is appreciated.

Computing System

Figure 8:
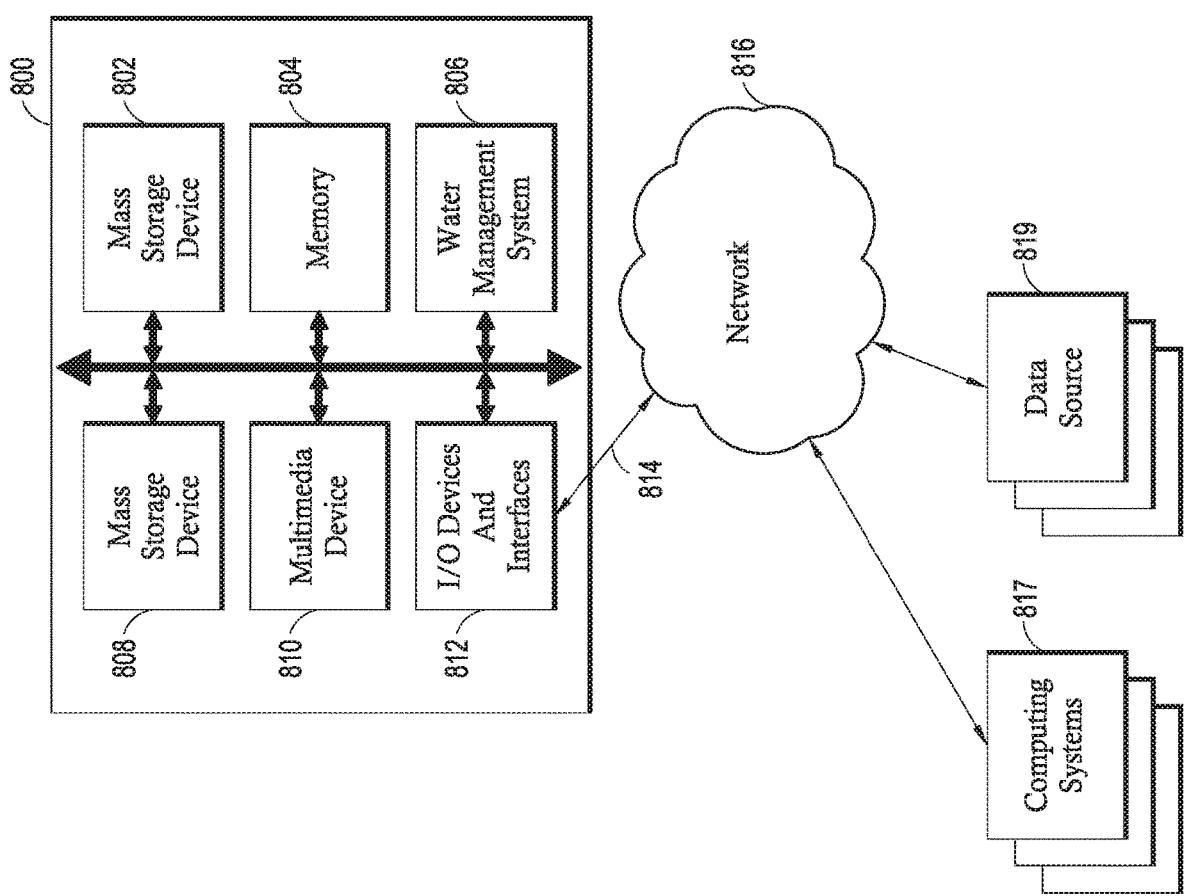
FIG. 8 is a block diagram in accordance with various embodiments depicting a computer hardware system configured to execute software for implementing one or more embodiments of the smart water conservation systems and methods disclosed herein.

With reference to FIG. 8, in some embodiments, the hardware systems and/or devices described above can take the form of a computing system 800, which is a block diagram of some embodiments of a computing system that is in communication with one or more computing systems 817 and/or one or more data sources 819 via one or more networks 816. The computing system 800 may be used to implement one or more of the systems and methods described herein. In addition, in some embodiments, the computing system 800 may be configured to manage access or administer a software application. While FIG. 8 illustrates an embodiment of a computing system 800, it is recognized that the functionality provided for in the components and modules of computing system 800 may be combined into fewer components and modules or further separated into additional components and modules.

Smart Water-Saving System

In some embodiments, the computing system 800 comprises a water management system 806 that carries out the functions described herein with reference to management of water, including any one of the techniques described above. The water management system 806 and/or other modules may be executed on the computing system 800 by a central processing unit 802 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

The computing system 800 can comprise a central processing unit ("CPU") 802, which may comprise a conventional microprocessor. The computing system 800 further comprises a memory 804, such as random access memory ("RAM") for temporary storage of information and/or a read only memory ("ROM") for permanent storage of information, and a mass storage device 808, such as a hard drive, diskette, or optical media storage device. Typically, the modules of the computing system 800 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 800 comprises one or more commonly available input/output (I/O) devices and interfaces 812, such as a keyboard, mouse, touchpad, and printer. In some embodiments, the I/O devices and interfaces 812 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 812 comprise a microphone and/or motion sensor that allow a user to generate input to the computing system 800 using sounds, voice, motion, gestures, or the like. In the embodiment of the above figure, the I/O devices and interfaces 812 also provide a communications interface to various external devices. The computing system 800 may also comprise one or more multimedia devices 810, such as speakers, video cards, graphics accelerators, and microphones, for example.

Computing System Device/Operating System

The computing system 800 may run on a variety of computing devices, such as, for example, a specifically designed device, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 800 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 800 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of the above figure, the computing system 800 is coupled to a network 816, such as a LAN, WAN, or the Internet, for example, via a wired, wireless, or combination of wired and wireless, communication link 814. The network 816 communicates with various computing devices and/or other electronic devices via wired or wireless communication links. In the embodiment of the above figure, the network 816 is communicating with one or more computing systems 817 and/or one or more data sources 819.

Access to the water management system 806 of the computer system 800 by computing systems 817 and/or by data sources 819 may be through a web-enabled user access point such as the computing systems' 817 or data source's 819 personal computer, mobile device, cellular phone, smartphone, laptop, tablet computer, e-reader device, audio player, or other device capable of connecting to the network 816. Such a device may have a browser module that is implemented as a module that uses text, graphics, audio, video, and other media to present data and to allow interaction with data via the network 8106.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 812 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 800 may comprise a physical or logical connection established between a remote microprocessor and a mainframe host computer for the express purpose of uploading, downloading, or viewing interactive data and databases on-line in real time. The remote microprocessor may be operated by an entity operating the computer system 800, including the client server systems or the main server system, and/or may be operated by one or more of the data sources 819 and/or one or more of the computing systems 817. In some embodiments, terminal emulation software may be used on the microprocessor for participating in the micro-mainframe link.

In some embodiments, computing systems 817 who are internal to an entity operating the computer system 800 may access the water management system 76 internally as an application or process run by the CPU 802.

User Access Point

In an embodiment, a user access point or user interface comprises a personal computer, a laptop computer, a tablet computer, an e-reader device, a mobile device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Computing Systems

In addition to the systems that are illustrated in the above figure, the network 816 may communicate with other data sources or other computing devices. The computing system 800 may also comprise one or more internal and/or external data sources. In some embodiments, one or more of the data repositories and the data sources may be implemented using a relational database, such as DB2, Sybase, Oracle, Code-Base and Microsoft® SQL Server as well as other types of databases such as, for example, a flat file database, an entity-relationship database, and object-oriented database, and/or a record-based database.

For example, in some embodiments, the computing system 800 described above may include an electronic tracking system which tracks shower data statistics such as, for example, water usage, shower time, average water temperature, flow rates activated, zones used, time spent in each zone, and water saved (e.g., relative to a normal shower of similar duration), among any other suitable shower metric. In some embodiments, the system 100 may use one or more timers to track a user's shower length and one or more flow sensors (also referred to as flow meters) to track a user's water usage. In some embodiments, the tracked data may be tracked and viewed on per shower, daily, weekly, monthly, yearly, and/or lifetime basis via a mobile application and/or other control system. In some embodiments, the tracked data may be tracked and viewed collectively for all users, collectively for some users, and/or individually for individual users of the device. In some embodiments, the tracked data may be shared and compared on a network so that users can compare their shower data statistics with other users, set goals, and save water. For example, in some embodiments, the mobile application and/or other control system may allow users to track their water usage and/or water waste and/or share their water conservation numbers with their social networks through a social media website or platform. In some embodiments, the flow tracking capability of the system 100 will allow users to retrieve, process, and analyze such metrics (e.g., water usage, shower length, flow rates activated, among others) through their mobile device (e.g., smartphone). The tracked data can be shared with other users of the system 100 and show average metrics on a user interface of the system 100 (or their mobile device or other control system) to keep users constantly aware of their usage. In this way, even a single shower with the device can reach beyond the shower and increase water conservation awareness and motivate others to get involved and make efforts to save water.

In some embodiments, users can download the mobile application and create user accounts in which they may set temperature preferences, calibrate shower zones, and/or set timers and goals, among other preferences, as well as follow their water usage and water savings, in addition to other users' water usage and water savings.

In some embodiments, the system, user interface, or wireless communication application may have an administrative override feature. For example, in some embodiments, a parental override feature may be programmed so that parents will be able to pre-set the device to have specific settings that other users will be unable to control. In some embodiments, a commercial override feature may be programmed so that the device may be managed and controlled via an administrative account. In such embodiments, the administrative account may be able to control and customize the device settings so that guests in the shower would not have to understand the device, user interface, or wireless communication application to use the device. In such embodiments, parents and/or system administrators can limit and/or control the water temperature, the flow rate, the shower length, and the water usage of the system 100 and/or can override a user shower preferences.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the present disclosure or claims.

Although the present disclosure has described various embodiments and examples, it will be understood by those skilled in the art that the present disclosure extends beyond the specifically disclosed embodiments to other alternative embodiments and/or uses of the present disclosure and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present disclosure should not be limited by the particular disclosed embodiments described above. Moreover, language such as "up to," "at least," "greater than," "less than," "between," and the like includes the number recited. Numbers or qualities or characteristics or amounts or quantities preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

We claim:

1. A smart water conservation system for use in a shower comprising:
   a flow assembly configured to discharge fluid received from a fluid source to a shower area at a variable flow rate, the flow assembly comprising a flow path and one or more valves positioned along the flow path;
   a proximity sensor system comprising one or more proximity sensors positioned within a housing of the flow assembly, the proximity sensor system being configured to detect a person's proximity to the smart water conservation system;
   a temperature sensor system comprising one or more temperature sensors, the temperature sensor system being configured to measure the temperature of a fluid in the flow path;
   a controller configured to control operation of the smart water conservation system based on user input and administrative input and at least in part on signals received from at least one of the proximity sensor system and the temperature sensor system, the controller further configured to:

adjust the one or more valves in response to signals received from at least one of the proximity sensor system and the temperature sensor system to vary the flowrate at which fluid is discharged from an output of the smart water conservation system; and wherein the shower area is separated into a plurality of zones based on a distance from the system that are configurable by user input, the controller being further configured to identify in which of the plurality of zones a user is positioned in response to the one or more signals received from the proximity sensor system, and wherein a previously stored administrative input configuration causes the controller to override the user input configuration in controlling the operation of the smart water conservation system.

2. The smart water conservation system of claim 1, wherein the one or more valves are selected from the group consisting of a variable flow valve and an on-off valve, the variable flow valve being selected from the group consisting of a ball valve, a step motor valve, a gate valve, a check valve, and a proportional valve, and the on-off valve being selected from the group consisting of a flip-flop valve and a solenoid valve.

3. The smart water conservation system of claim 2, wherein the flow assembly comprises one variable flow valve, the controller being further configured to vary the opening size of the one variable flow valve to vary the plurality of flowrates discharged from the system at any flowrate percentage in the range of approximately 0% and approximately 100%.

4. The smart water conservation system of claim 3, the controller being further configured to vary the opening size of the one variable flow valve to vary the plurality of flowrates discharged from the system at approximately 10% increments between 0% and 100%.

5. The smart water conservation system of claim 2, wherein the flow assembly comprises three on-off flow valves, the controller being further configured to fully open, partially open, or close the three on-off flow valves in any combination to vary the plurality of flowrates discharged from the system.

6. The smart water conservation system of claim 5, the controller being further configured to fully open and close the three on-off flow valves in any combination so that the plurality of flowrates discharged from the system comprise first, second, third, and fourth flowrate percentages, wherein the first flowrate percentage is in the range of 0% to 35%, the second flowrate percentage is in the range of 20% to 55%, the third flowrate percentage is in the range of 40% to 75%, and the fourth flowrate is in the range of 50% to 100%.

7. The smart water conservation system of claim 6, wherein the first, second, third, and fourth flowrate percentages comprise approximately 0%, approximately 30%, approximately 67%, and approximately 100%, respectively.

8. The smart water conservation system of claim 1, wherein the proximity sensor system is configured to detect a person's distance from the system in the range of approximately 0.1 meters to approximately 4.0 meters.

9. The smart water conservation system of claim 1, wherein the controller is further configured to compare a measured temperature against a temperature threshold, and wherein the controller is further configured to close the one or more flow valves when the measured temperature is greater than or equal to the temperature threshold to terminate the flow through the system.

10. The smart water conservation system of claim 9, wherein the temperature threshold is a temperature in the range of approximately 80 degrees Fahrenheit to approximately 100 degrees Fahrenheit.

11. The smart water conservation system of claim 1, further comprising a display, wherein the controller is further configured to provide an indication of flowrate or flowrate percentage on the display.

12. A smart water conservation system for use in a shower comprising:

a flow assembly configured to discharge fluid received from a fluid source to a shower area at a variable flow rate, the flow assembly comprising a flow path and one or more valves positioned along the flow path;

a proximity sensor system comprising one or more proximity sensors positioned within a housing of the flow assembly, the proximity sensor system being configured to detect a person's proximity to the smart water conservation system;

a controller configured to control operation of the smart water conservation system based on user input and administrative input and at least in part on signals received from the proximity sensor system, the controller further configured to:

adjust the one or more valves in response to signals received from the proximity sensor system to vary the flowrate at which fluid is discharged from an output of the smart water conservation system; and wherein the shower area is separated into a plurality of zones based on a distance from the system that are configurable by user input, the controller being further configured to identify in which of the plurality of zones a user is positioned in response to the one or more signals received from the proximity sensor system, and wherein a previously stored administrative input configuration causes the controller to override the user input configuration in controlling the operation of the smart water conservation system.

13. The smart water conservation system of claim 12, wherein the one or more valves comprise at least one of a variable flow valve and an on-off flow valve.

14. The smart water conservation system of claim 13, wherein the controller is further configured to vary the opening size of the variable flow valve and to open and close the on-off flow valve to vary the plurality of flowrates discharged from the system at any flowrate percentage in the range of approximately 0% and approximately 100%.

* * * * *